US007623739B2

(12) United States Patent
Hersch et al.

(10) Patent No.: US 7,623,739 B2
(45) Date of Patent: Nov. 24, 2009

(54) METHOD AND COMPUTING SYSTEM FOR CREATING AND DISPLAYING IMAGES WITH ANIMATED MICROSTRUCTURES

(75) Inventors: Roger D. Hersch, Epalinges (CH); Bernard Wittwer, Puidoux (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 1242 days.

(21) Appl. No.: 09/902,227

(22) Filed: Jul. 11, 2001

(65) Prior Publication Data
US 2003/0026500 A1    Feb. 6, 2003

(51) Int. Cl.
*G06K 9/54* (2006.01)
(52) U.S. Cl. .................................... 382/302
(58) Field of Classification Search ......... 382/293–294, 382/302, 308, 301, 306, 292, 290, 135, 137, 382/138, 140, 100, 252, 267; 345/619, 473–475, 345/596, 647, 588, 640, 960, 606, 955, 632, 345/949, 636, 638, 646, 582, 583; 358/3.28, 358/3.13–3.19; 348/574; 352/87
See application file for complete search history.

(56) References Cited

U.S. PATENT DOCUMENTS

| 3,937,878 | A | * | 2/1976 | Judice | 348/798 |
| 4,398,890 | A | * | 8/1983 | Knowlton | 434/96 |
| 5,148,273 | A | * | 9/1992 | Lippel | 348/390.1 |
| 5,241,373 | A | * | 8/1993 | Kanamori et al. | 348/645 |
| 5,296,923 | A | * | 3/1994 | Hung | 358/527 |
| 5,325,480 | A | * | 6/1994 | Rice | 345/474 |
| 5,396,559 | A | * | 3/1995 | McGrew | 380/54 |
| 5,422,742 | A | * | 6/1995 | Ostromoukhov et al. | 358/536 |
| 5,530,759 | A |   | 6/1996 | Braudaway et al. | |

(Continued)

FOREIGN PATENT DOCUMENTS

EP    99 114 740.6    7/1999

OTHER PUBLICATIONS

Terasawa et al., Rendering Objects with Small Elements Based on Their Micro and Macro Structures,Jun. 22-26, 1998, Proceeding Computer Graphics International, 1998,pp. 268-272.*

(Continued)

*Primary Examiner*—Bhavesh M Mehta
*Assistant Examiner*—Dennis Rosario

(57) ABSTRACT

The display of images comprising animated microstructures can be used to create beautiful information and publicity sites attracting the attention of clients. Especially for clients visiting Web sites, images with animated microstructures are capable of forwarding a message incorporated into the animated microstructure (e.g. an advertisement).

The present invention discloses a method for creating, respectively, displaying a target image with an animated microstructure, where the target image is made of a succession of target image instances which differ from each other by an embedded microstructure which evolves over time. An animated microstructure image requires the definition of an original image, an embedded microstructure, a transformation describing how the microstructure evolves over successive image instances, possibly a warping transformation mapping the target image space into the animated microstructure and possibly a set of basic colors for rendering target image instances.

The invention also comprises a computing system capable of displaying an image with an embedded microstructure evolving over time, where from far away mainly the image is visible and from nearby mainly the evolving microstructure is visible.

17 Claims, 17 Drawing Sheets

U.S. PATENT DOCUMENTS

| | | | | |
|---|---|---|---|---|
| 5,600,773 | A | * | 2/1997 | Vanover et al. ............. 345/473 |
| 5,712,731 | A | * | 1/1998 | Drinkwater et al. ......... 359/619 |
| 5,760,918 | A | * | 6/1998 | Tanioka et al. .............. 358/445 |
| 5,856,829 | A | * | 1/1999 | Gray et al. ................... 345/422 |
| 5,936,606 | A | * | 8/1999 | Lie ............................. 345/629 |
| 6,047,088 | A | * | 4/2000 | van Beek et al. ............ 382/243 |
| 6,092,732 | A | * | 7/2000 | Curry ........................ 358/3.28 |
| 6,198,545 | B1 | | 3/2001 | Ostromoukhov et al. .... 358/459 |
| 6,230,170 | B1 | * | 5/2001 | Zellweger et al. ........... 715/512 |
| 6,272,650 | B1 | * | 8/2001 | Meyer et al. ................... 714/38 |
| 6,389,075 | B2 | * | 5/2002 | Wang et al. ............ 375/240.16 |
| 6,504,545 | B1 | * | 1/2003 | Browne et al. .............. 345/473 |
| 6,526,580 | B2 | * | 2/2003 | Shimomura et al. .......... 725/63 |
| 6,535,638 | B2 | * | 3/2003 | McGrew ...................... 382/210 |
| 6,603,576 | B1 | * | 8/2003 | Nakamura et al. ......... 358/3.28 |
| 6,608,631 | B1 | * | 8/2003 | Milliron ..................... 345/647 |
| 6,766,299 | B1 | * | 7/2004 | Bellomo et al. ............. 704/276 |
| 6,853,469 | B1 | * | 2/2005 | Tresser ...................... 358/3.06 |
| 7,012,616 | B1 | * | 3/2006 | Chatterjee ................... 345/592 |

OTHER PUBLICATIONS

Miller, The Motion Dynamics of Snakes and Worms,1998, ACM Press,pp. 169-173.*

Finkelstein et al., Lecture Notes in Computer Science: Electronic Publishing, Artistic Imaging, and Digital Typography: Image Mosaics, Mar. 30-Apr. 3, 1998, Springer Berlin, vol. 1375/1998, pp. 11-22.*

Yu et al., Video Screening, Aug. 2005, Bridges: Mathematical Connections in Art, Music and Science, unnumbered:8 pages total.*

Eissele et al., Frame-to-Frame Coherent Halftoning in Image Space, Jun. 10, 2004, Proceeding: Theory and Practice of Computer Graphics, unnumbered: 8 pages total.*

U.S. Appl. No. 09/477,544, filed Jan. 4, 2000, V. Ostromoukhov, R.D. Hersch Method and Apparatus for Generating Digital Halftone Images by Using Multi Color Dithering.

H.R. Kang, Digital Color Halftoning, SPIE Press and IEEE Press, Chapter 13, Clustered-dot ordered dither, 213-231.

H.R. Kang, Color Technology for Electronic Imaging Devices, SPIE Optical Engineering Press, 1997, Chapter 2, Color-mixing models, Section 1, pp. 34-40.

H.R. Kang, Color Technology for Electronic Imaging Devices, SPIE Optical Engineering Press, 1997, Section 4.4 Tetrahedral interpolation, pp. 70-72.

V. Ostromoukhov, R.D.Hersch, "Artistic Screening", Siggraph95, Proc. Computer Graphics, Annual Conference Series pp. 219-228.

V. Ostromoukhov, R.D. Hersch, "Multi-Color and Artistic Dithering", Siggraph'99, Computer Graphics Proceedings, Annual Conference Series, 1999, pp. 425-432.

M. Shapira, A. Rappoport, "Shape blending using the star-skeleton representation", IEEE Computer Graphics and Applications, vol. 15 Issue: 2, Mar. 1995, pp. 44-50.

Oleg Veryovka and John Buchanan, Halftoning with Image-Based Dither Screens, Graphics Interface Proceedings,1988-99, Ed. Scott MacKenzie and James Stewart, Morgan Kaufmann Publ. or http://www.graphicsinterface.org/proceedings/1999/106/.

Gregory M. Nielson, Hans Hagen, Heinrich Muller, Mueller (eds), Scientific Visualization : Overviews, Methodologies, and Techniques, IEEE Press, Chapter 20, Tools for Triangulations and Tetrahedrizations and Constructing Functions Defined over Them, pp. 429-509.

* cited by examiner

Warping grid

Mask

Dithered image

R: Red   C: Cyan     W: White
G: Green M: Magenta  K: Black
B: Blue  Y: Yellow

METHOD AND COMPUTING SYSTEM FOR CREATING AND DISPLAYING IMAGES WITH ANIMATED MICROSTRUCTURES

BACKGROUND OF THE INVENTION

The present invention relates generally to the field of publicity on the World Wide Web and more particularly to the generation and display of images with animated microstructures.

The World Wide Web is becoming an important platform for electronic commerce. Corporations and individuals access the Web in order to buy various goods, both immaterial and material goods. In order to attract clients to given Web sites, there is a need for both information and publicity. Presently, publicity is achieved by putting banners on Web pages of interest to potential clients. Sometimes, in order to attract the clients attention, text banners are successively displayed and erased. These "text blinking" actions are distracting the client and annoying him.

In the present invention, we disclose a new method for delivering publicity and information. According to this new method, an image (the global image) incorporates a microstructure which may be a text, a logo, an ornament, a symbol or any other microstructure. The microstructure may move, change or evolve over time. The image is either static or may also evolve over time. When seen from a certain distance, mainly the image is visible. When seen from nearby, mainly the microstructure is visible. At intermediate distances, both the microstructure and the global image are visible. Thanks to its inherent artistic beauty and to the way it forwards a message, the new method is attractive to clients.

Several attempts have already been made in the prior art to generate images incorporating information at the microstructure level where from far away mainly the global image is visible and from nearby mainly the microstructure is visible. A method hereinafter called "Artistic Screening" was disclosed in U.S. Pat. No. 6,198,545 (inventors: V. Ostromoukhov, R. D. Hersch, filed Mar. 27, 1995) and in the article by V. Ostromoukhov, R. D. Hersch, "Artistic Screening", Siggraph 95, Proc. Computer Graphics, Annual Conference Series pp. 219-228. Another method hereinafter called "Multicolor Dithering method" was disclosed in U.S. patent application Ser. No. 09/477,544 (inventors: V. Ostromoukhov, R. D. Hersch, filed Jan. 4, 2000) and in the article by V. Ostromoukhov, R. D. Hersch, "Multi-Color and Artistic Dithering", Siggraph'99, Computer Graphics Proceedings, Annual Conference Series, 1999, pp. 425-432. A further method for incorporating a microstructure into an image by computing color differences is disclosed in European Patent application 99 114 740.6 (inventors R. D. Hersch, N. Rudaz, filed Jul. 28, 1999). An additional method for creating microstructures within an image relies on a large dither matrix whose successive threshold levels represent the microstructure and uses standard dithering to render the final image (see for example the paper by Oleg Veryovka and John Buchanan, Halftoning with Image-Based Dither Screens, Graphics Interface Proceedings, 1988-99, Ed. Scott MacKenzie and James Stewart, Morgan Kaufmann Publ.

Another approach for embedding a microstructure within a color image relies on the modification of brightness levels while preserving the chromaticity of the image (see U.S. Pat. No. 5,530,759, Color Correct Digital Watermarking of Images, inventors: W. Braudaway, K. A. Magerlein and F. C. Mintzer). However, in this last method, if the microstructure incorporates large uniform surfaces, the global image may be subject to significant changes and the microstructure may become visible from a large distance.

Furthermore, all of these previous methods were focussed on static images, mainly for printing purposes and did not disclose how to create attractive dynamic images, i.e. images whose microstructure evolves over time.

The disclosed method distinguishes itself from traditional dynamic text display (for example traditional TV spots containing text lines moving across the display) by the fact that in the new method, the text is embedded as a microstructure layer within a global image which may be totally independent of the text. In addition, when seen from a certain distance, the microstructure disappears and only the global image remains visible.

SUMMARY

The display of images comprising animated microstructures can be used to create beautiful information and publicity sites attracting the attention of clients. Especially for clients visiting Web sites, images with animated microstructures are capable of forwarding a message incorporated into the animated microstructure. Such images with animated microstructures are especially attractive for advertisements on Web pages. The present invention discloses a method for creating, respectively, displaying a target image with an animated microstructure, where the target image is made of a succession of target image instances which differ from each other by an embedded microstructure which evolves over time. The method comprises the steps of defining an original image, defining how the embedded microstructure evolves over the succession of target image instances, possibly defining a set of basic colors for rendering target image instances, possibly defining a warping transformation mapping between a target image space containing the target image and the animated microstructure space, and rendering from the original image a succession of target image instances comprising the evolving embedded microstructure. The warping transformation allows to warp the evolving microstructure in the target image. In addition, a mask can be defined which specifies the part of the image to be rendered with an animated microstructure and the part which is being left unanimated. Furthermore, a multi-valued mask allows to control the intensity of the microstructure by providing the respective weights of the original image and the animated microstructure image in the target image. The preferred embodiment for rendering target image instances is a dithering method based either on standard dithering or on multicolor dithering. Both dithering methods use a dither matrix whose succession of threshold levels specifies shape of the embedded microstructure. The selected dithering method may be simply applied to one or several color layers of the original image or, if a set of basic colors has been defined, may be applied to one, several or all basic colors. The evolution of the embedded microstructure may be defined by an animation transformation mapping between an animated dither matrix space and an original dither matrix space paved by the dither matrix. The optional warping transformation maps positions from the target image space containing the target image to the animated dither matrix space.

In order to render the target image, initialization steps comprise selecting color information necessary for rendering the final evolving microstructure image, selecting a microstructure, selecting of a time-dependent animation transformation allowing the microstructure to evolve over time and possibly selecting a mask specifying regions of the original image that are to be rendered with the selected microstructure. The rendering steps comprise a conversion from original image colors to the basic colors selected during the initialization steps and an update of the current instance of the animation transformation when a new instance of the target image is to be rendered.

The present invention also comprise an image with an embedded microstructure evolving over time, where from far away mainly the image is visible and from nearby mainly the evolving microstructure is visible, and where said image is displayed as a succession of image instances, each image instance differing from previous image instances by the microstructure evolution. The visibility of the microstructure embedded into the image is tuned by a mask whose values represent relative weights of an original image without embedded microstructure and a corresponding image synthesized with the embedded microstructure. Mask values evolving over time yield apparent changes in the embedded microstructure appearance properties such as the visibility, location or spatial extension of the embedded microstructure within the image.

The invention also comprises image animations with an embedded microstructure evolving over time, where from far away mainly the image animation is visible and from nearby mainly the evolving microstructure is visible, and where, when seen from nearby, frames differentiate themselves from previous frames also due to microstructure evolution. As in the case of an image with evolving embedded microstructure, the mask values specifying the part of the image to be rendered with an embedded microstructure as well as its intensity may themselves evolve over time and for example follow certain moving structures within the image animation.

The invention also comprises a computing system capable of displaying an image with an embedded microstructure evolving over time, where from far away mainly the image is visible and from nearby mainly the evolving microstructure is visible. This computing system is made of a server computing system storing the image as a sequence of image instances and of a client computing system capable of receiving the sequence of image instances from the server computing system and capable of displaying this sequence. In another embodiment, the computing system comprises a server computing system and a client computing and display system, where the client computing and display system receives from the server computing system as input data an original color image, microstructure data, microstructure evolution parameters and possibly color information and where the client computing and display system synthesizes and displays the target image with the embedded microstructure on the fly.

BRIEF DESCRIPTION OF THE DRAWINGS

For a better understanding of the present invention, one may refer by way of example to the accompanying drawings, in which:

FIG. 1A shows a dither matrix where the microstructure is given by the sequence of dither threshold levels, represented in the figure as gray levels;

FIG. 1B shows an enlargement of a part of the dither matrix of FIG. 1A demonstrating how the dither threshold levels define the microstructure;

FIG. 2 shows uniform intensity patches dithered with the dither matrix of FIG. 1;

DETAILED DESCRIPTION OF THE INVENTION

Figures 1A, 1B:
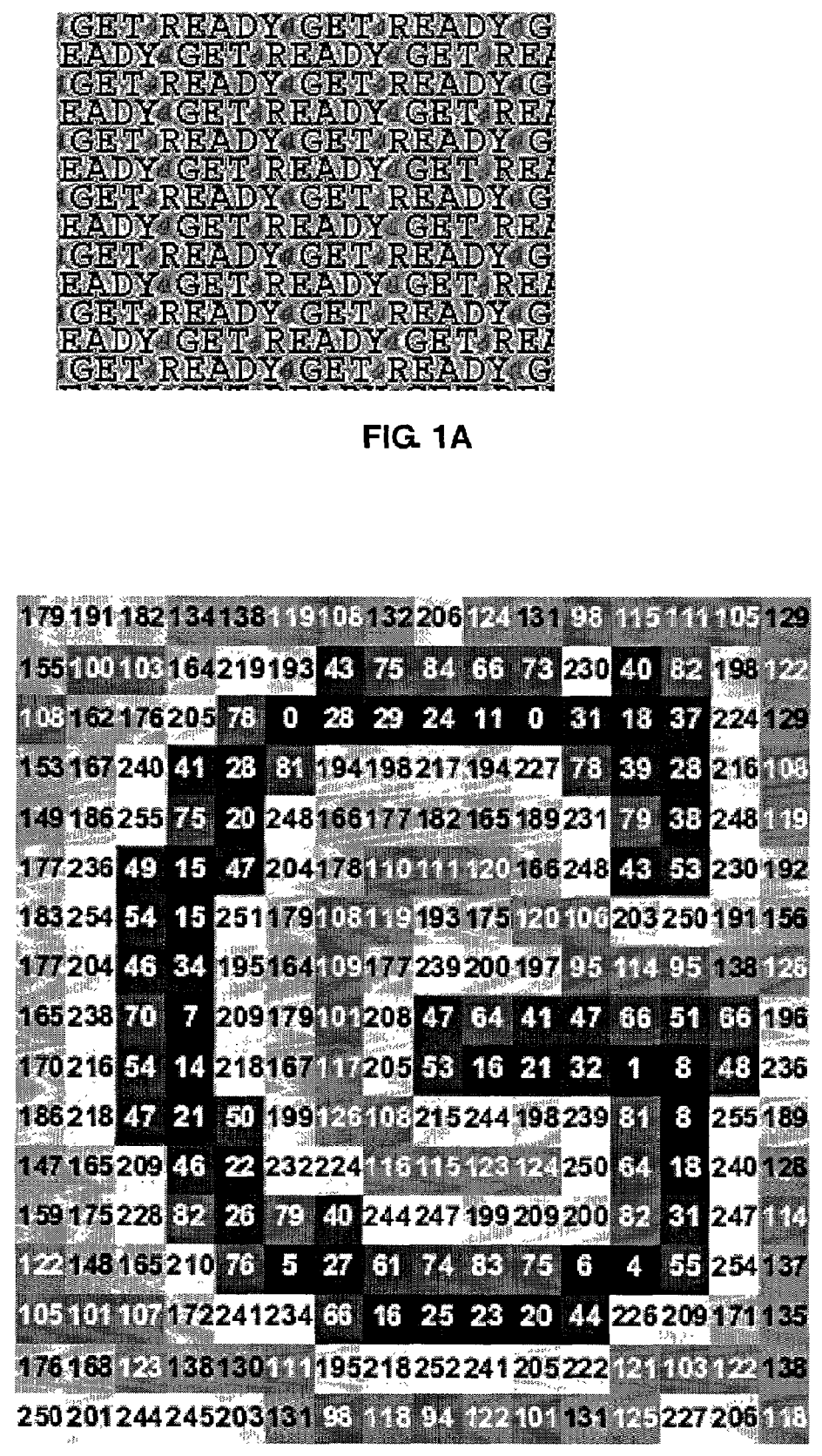
Figure 5:
FIG. 5 shows one instance of the animated microstructure image obtained by multicolor dithering of the original image shown in FIG. 3.

In principle, any of the methods described above for generating images incorporating information at the microstructure level can be used to create or display images with embedded animated microstructures. However, since Artistic Screening is restricted to bi-color images (foreground color and background color) and since the method based on color differences requires considerable computing power, the preferred method for synthesizing images with embedded animated microstructures is based either on standard dithering or on the Multicolor Dithering method cited above. Hereinafter, the term dithering without the adjective "standard" or "multicolor" will refer to both standard dithering and Multicolor Dithering. Standard as well as Multicolor Dithering make use of a dither matrix, whose distribution of dither threshold values represents the microstructure that will be part of the resulting target image (FIG. 1A and FIG. 1B). Both standard dithering and Multicolor Dithering reproduce an input image (also called original or global image) in such a way that when seen from nearby, mainly the microstructure embedded into the global image is visible, whereas when seen from far away, mainly the global image is visible (FIG. 5).

Standard Dithering

Figure 2:
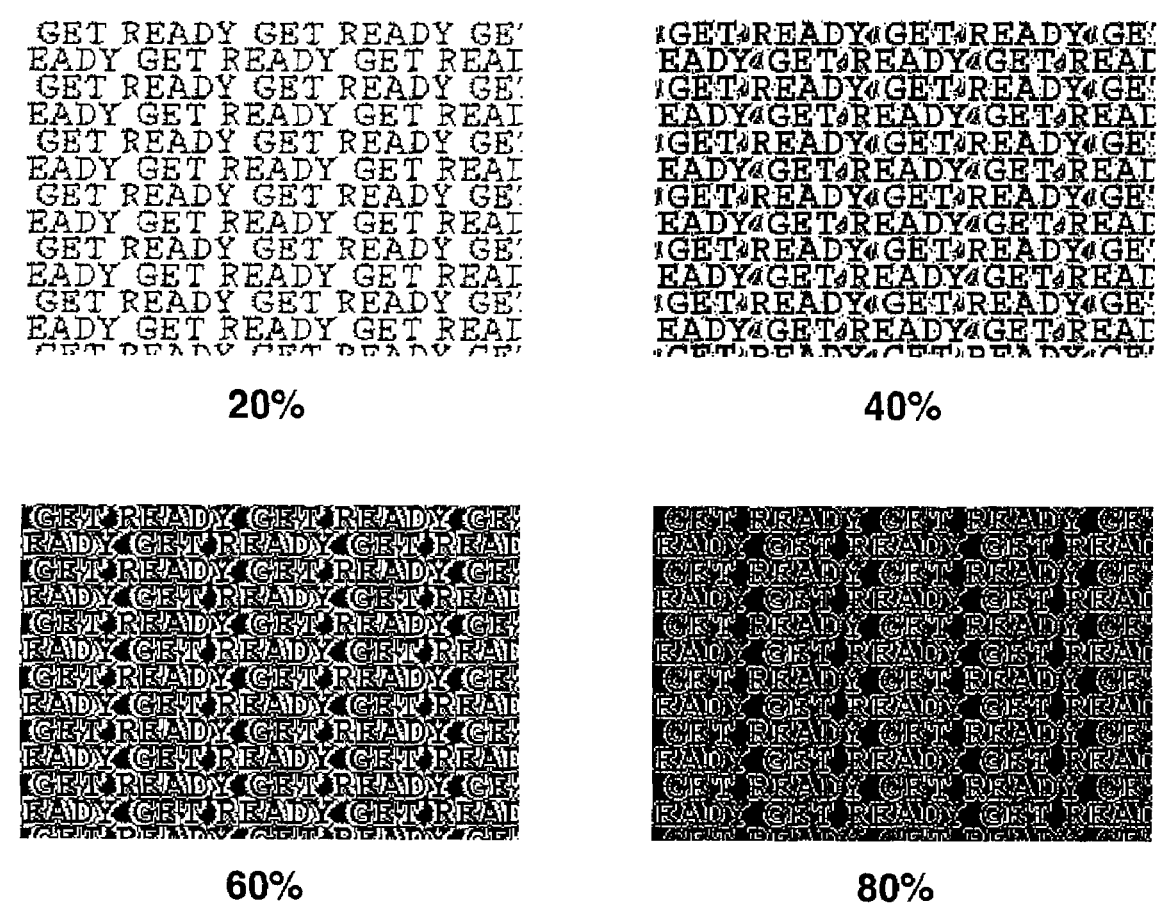
Figure 7A:
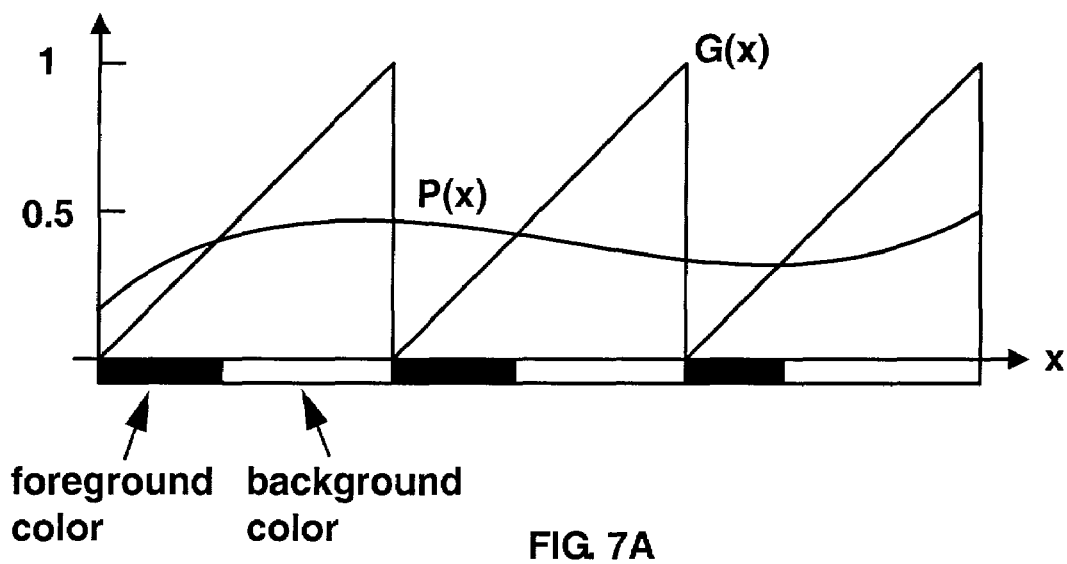
FIG. 7A shows schematically a comparison between an input intensity signal (or image) P(x) and a dither threshold value G(x) and according to that comparison, the setting of a foreground or background color.

Multicolor Dithering is an extension of standard dithering. Standard dithering converts an intensity into a surface percentage. An intensity $P(x)$ of foreground color C is compared with a dither threshold value $G(x)$ and according to the comparison (see FIG. 7A), if $P(x)>G(x)$, the corresponding location x is set to the foreground color and if $P(x)<=G(x)$, it is left as back-ground color. FIG. 1A gives an example of a large dither matrix incorporating the microstructure "GET READY"; FIG. 1B shows an enlarged part of it and FIG. 2 represents the reproduction of uniform single color images at 20%, 40%, 60% and 80% foreground color intensity (the foreground color is represented as black). For more explanations on standard dithering, see H. R. Kang, Digital Color Halftoning, SPIE Press and IEEE Press, chapter 13, 213-231.

Multicolor Dithering

Figure 7B:
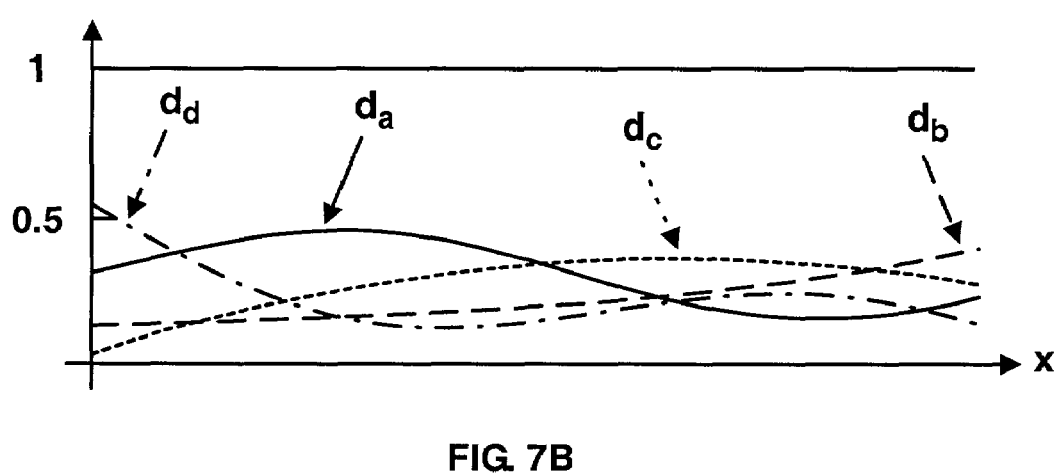
FIG. 7B shows relative intensities $d_a$, $d_b$, $d_c$, and $d_d$ of colors $C_a$, $C_b$, $C_c$, and $C_d$.
Figure 7C:
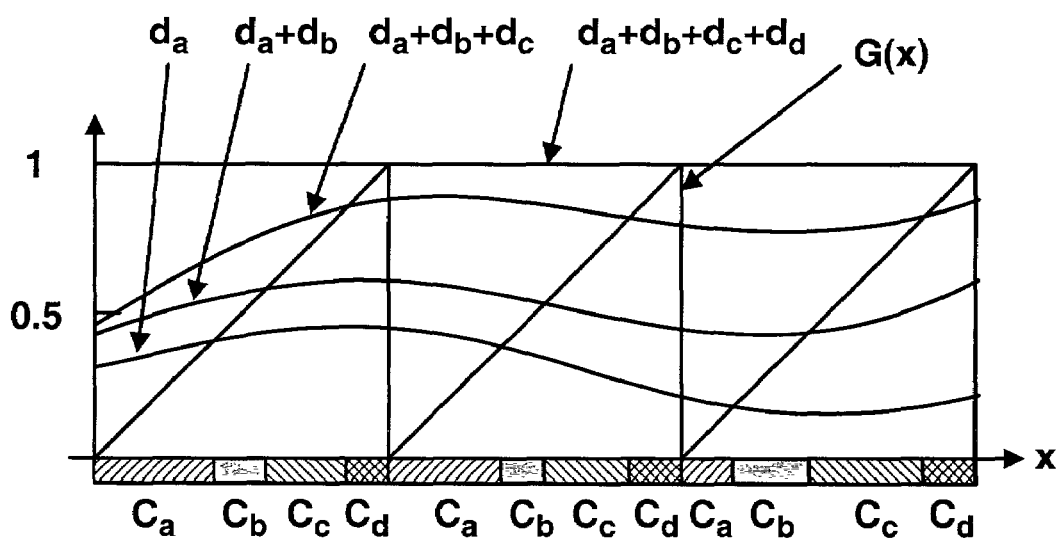
FIG. 7C shows the conversion of relative intensities $d_a$, $d_b$, $d_c$, and $d_d$ of colors $C_a$, $C_b$, $C_c$, and $C_d$ into corresponding surface coverages.

In Multicolor Dithering, a color C is rendered by a barycentric combination of several basic colors, for example the combination of 4 colors $C_a$, $C_b$, $C_c$, and $C_d$. Their respective relative weights are $d_a$, $d_b$, $d_c$, and $d_d$ (FIG. 7B). Multicolor Dithering converts these relative weights into relative surface coverages. Multi-color dithering consists of determining the position of threshold value G in respect to intervals $0 \ldots d_a$, $d_a \ldots (d_a+d_b)$, $(d_a+d_b) \ldots (d_a+d_b+d_c)$, $(d_a+d_b+d_c) \ldots 1$, (see FIG. 7C). According to the interval within which G is located, the dithered target image color $C(x,y)$ will take value $C_a$, $C_b$, $C_c$, or $C_d$ (see FIG. 7C, color values along the x-axis). More precisely, if $0<=G<d_a$, $C(x,y)=C_a$; if $d_a<=G<(d_a+d_b)$, $C(x,y)=C_b$; if $(d_a+d_b)<=G<(d_a+d_b+d_c)$, $C(x,y)=C_c$; and if $(d_a+d_b+d_c)<=G<=1$, $C(x,y)=C_d$. Best results are obtained by ordering the 4 basic colors $C_a$, $C_b$, $C_c$, and $C_d$ located at the vertices of a tetrahedron according to their increasing CIE-LAB lightness values L*.

Figure 8:
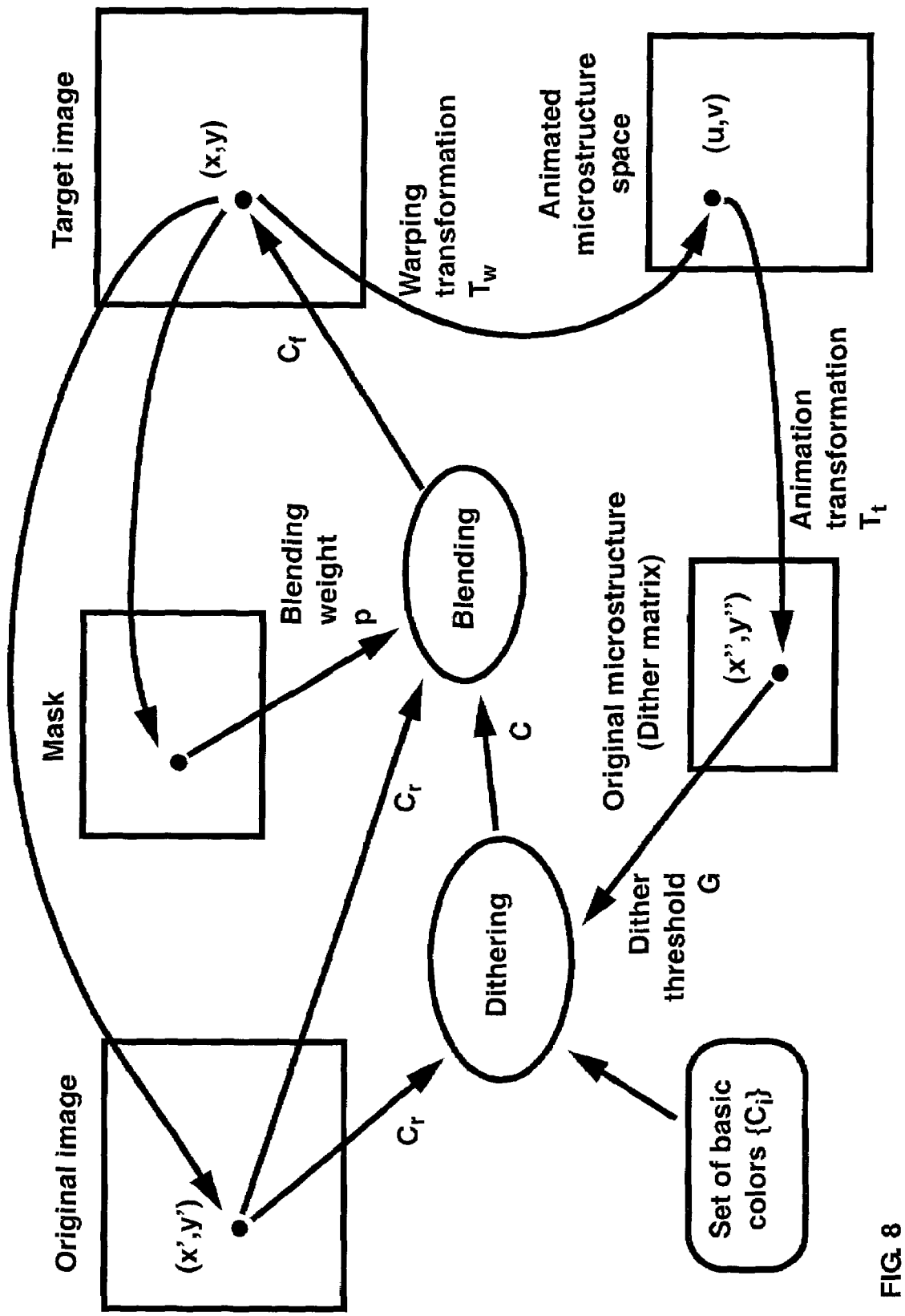
FIG. 8 shows a diagram of elements useful for creating images with animated microstructures.

The method for generating and displaying images incorporating animated microstructures requires the definition of the following elements (see FIG. 8):

- an original image (also called global image);
- an original microstructure, preferably embodied as a dither matrix;
- color information necessary for rendering the target animated microstructure image (optional);
- a time-dependent animation transformation $T_t$ specifying an animated microstructure evolving as a function of time;
- a warping transformation $T_t$ specifying a warping between the animated or initial microstructure and the warped microstructure (optional);

and optionally a mask specifying the global image portions which are to be rendered with animated microstructures as well as a possible blending between original image and pure animated microstructure image, the blending allowing to specify microstructure appearance properties such as visibility, position and spatial extension of the microstructure.

The original image is located in an original image space (x',y'), the original microstructure is located in an original microstructure space (also called original dither matrix space) (x",y"), the animated microstructure is located in an animated microstructure space (also called animated dither matrix space) (u',v'), and the target animated microstructure image is located in the target animated microstructure image space, also simply called target image space (x,y).

Hereinafter, original image (x',y') may stand for original image space (x',y'), original microstructure (x",y") may stand for original microstructure space (x",y"), animated microstructure may stand for animated microstructure space (u',v') and target image (x,y) may stand for target image space (x,y).

The microstructure may represent a text, a logo, a symbol, an ornament or any other kind of visual motive. Furthermore, the microstructure may combine several items, e.g. several symbols either identical or different, or a freely chosen combination of text, logos, symbols and ornaments. In the preferred cases of standard dithering and Multicolor Dithering, the microstructure is defined by a dither matrix whose succession of dither threshold levels represent the desired visual motives (FIG. 1B).

The time-dependent animation transformation $T_t$ may either be a time-dependent geometric transformation (e.g. translation, rotation, scaling, linear transformation, non-linear geometric transformation) or any other time dependent transformation creating from at least one microstructure a transformed microstructure whose shape varies in time. For example the time-dependent animation transformation may comprise a blending between two microstructure shapes (a shape blending method is described in M. Shapira, A. Rappoport, "Shape blending using the star-skeleton representation", IEEE Computer Graphics and Applications, Volume: 15 Issue: 2, March 1995, pp. 44-50). In a preferred embodiment, the animation transformation $T_t$ provides the mapping between animated dither matrix space (u,v) and original dither matrix space (see FIG. 12).

Figure 12:
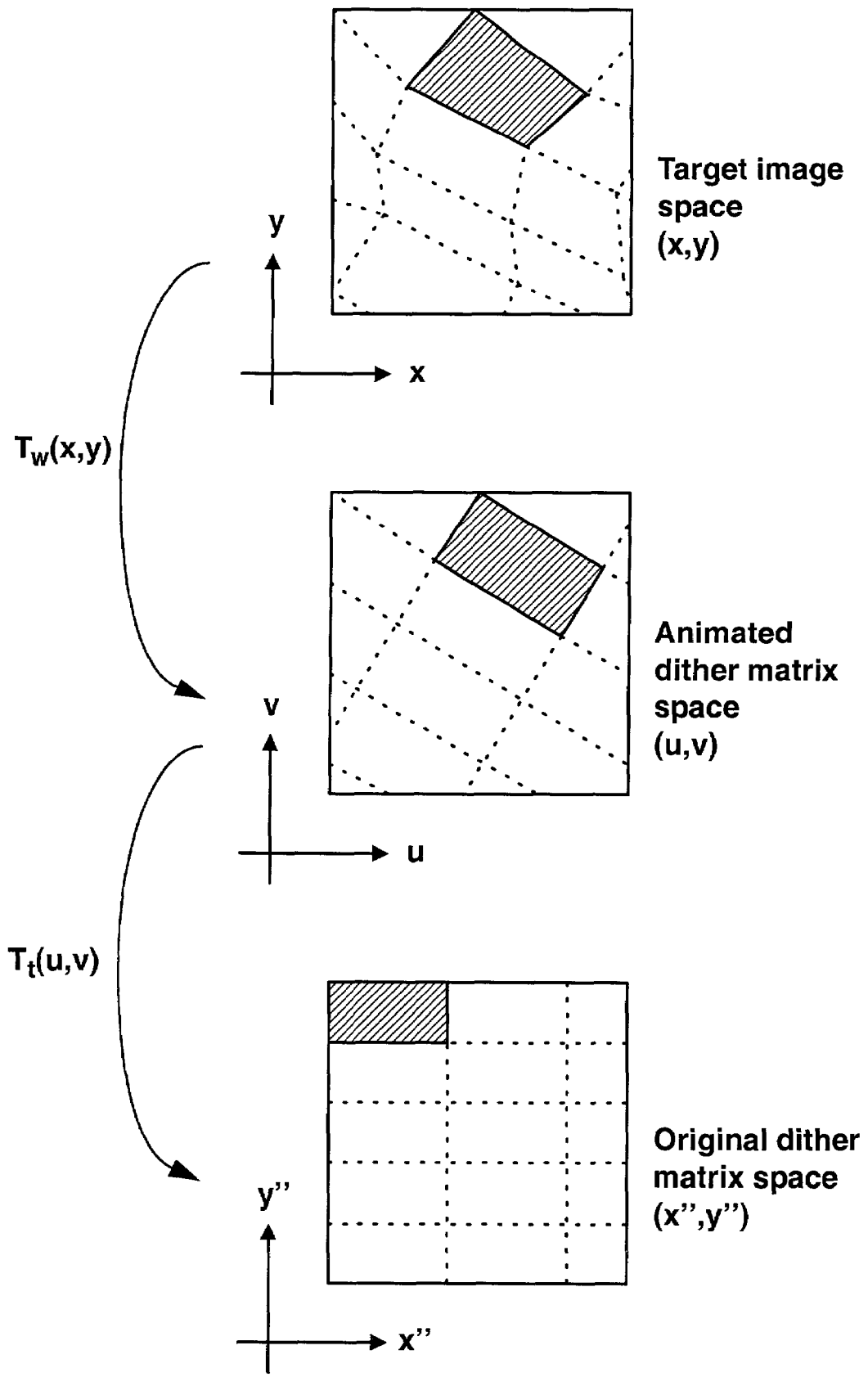
FIG. 12 shows the warping transform $T_w(x,y)$ mapping from target image space to animated dither matrix space and the animation transform $T_t(u,v)$ mapping from animated dither matrix space to the original dither matrix space.
Figure 13A:
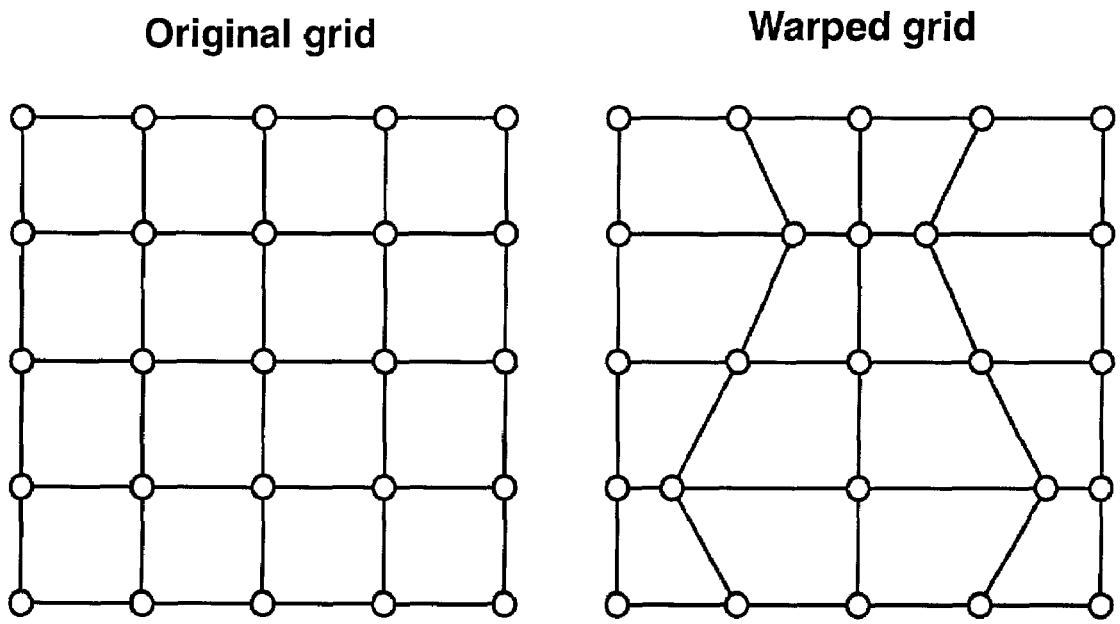
FIG. 13A shows a rectangular grid and the warped rectangular grid specifying the warping transform between target image space and animated microstructure space.

The warping transformation $T_w(x,y)$ which provides a warping between the target image space (x,y) and the animated dither matrix space (u,v) may either be given by a formula allowing to obtain from a location (x,y) in the target image space the corresponding location (u,v) in the animated dither matrix space or by a program function returning for a given (x,y) coordinate in the final target image space the corresponding location (u,v) in the animated dither matrix space (see FIG. 12, transformation $T_w(x,y)$). Alternately, the warping transformation may be specified piecewise, by allowing the designer to specify a rectangular grid of control points and by allowing him to warp this grid as shown in FIG. 13A.

The color information necessary for rendering the target animated microstructure image may comprise either an indication of which original image color layers $\{C_i\}$ are to used for rendering the target animated microstructure image or the specification of a set of basic colors $\{C_i\}$ comprising possibly colors different from red, green and blue, cyan, magenta, yellow, white and black, with which the target image is to be synthesized. Colors members of the set of colors $\{C_i\}$ used for animated microstructure image rendering are called hereinafter "basic colors".

In the case of a mask with more than two levels of intensity, the mask's values specify a blending between the image rendered with microstructures, for example by dithering (standard or multicolor) and the color obtained by simple resampling of the original image according to the target's image size and resolution. Such a blending between the resampled original image and the image rendered with animated microstructures allows to produce less pronounced animated microstructures. It is also possible to apply a spatial blending between the scaled original image and the dithered image as described in the section "Image Rendering". In addition, the mask's values may evolve over time, yielding apparent changes in embedded microstructure appearance properties such as visibility, position or spatial extension.

The method for generating an animated microstructure target image is formulated in general terms so as to encompass all methods capable of generating information at the microstructure level. However, in a preferred embodiment, either standard dithering or multicolor dithering is used.

The method for generating a target image with an embedded animated microstructure comprises the following steps (see FIG. 8):

(a) definition of elements required for generating the target image, i.e. an original image, an original microstructure (in a preferred embodiment, an original dither matrix), possibly color information specifying a set of basic colors $\{C_i\}$ used for rendering the target animated microstructure image, a time-dependent animation transformation, possibly a warping transformation and a mask;

(b) traversing the target image (x,y) pixel by pixel and row by row, determining corresponding positions in the original image (x',y'), in the animated microstructure (preferred embodiment: animated dither matrix) (u,v), in the original microstructure (preferred embodiment: original dither matrix) (x",y") and in the mask;

(c) obtaining from the original image position (x',y') the color $C_r$ to be reproduced, from the original microstructure (preferred embodiment: original dither matrix) space position (x",y") the rendering information (preferred embodiment: the dither threshold value G) and from the current mask position the corresponding mask value p;

(d) carrying out the target image rendering algorithm (preferred embodiment: standard dithering or multicolor dithering) and determining output color C, possibly from the set of basic colors $\{C_i\}$;

(e) according to the mask value p, performing a blending between rendered (preferred embodiment: dithered) output color C and original image color $C_r$.

If the mask value p indicates that the present image location does not need to be rendered with animated microstructures, then step (c) is modified to directly put color $C_r$ to be reproduced in the target image and steps (d) and (e) are skipped. If the mask is inexistant, then the whole image is reproduced with animated microstructures.

The original image may be a simple RGB color image stored in any known format. The microstructure, in a preferred embodiment, the dither matrix, is either precomputed and ready to use or has been created applying one or several tools. A known technique of converting bi-level microstructures such as typographic characters, logos or ornaments into dither matrices comprises (a) low-pass filtering in order to create a multi-level image, (b) renumbering of the image intensity levels in order to create the dither levels of the dither matrix, and (c) matrix equilibration in order to improve the dither matrix quality (see V. Ostromoukhov, R. D. Hersch, "Multi-Color and Artistic Dithering", Siggraph'99, Computer Graphics Proceedings, Annual Conference Series, 1999, pp. 425-432).

Generation of Animated Microstructure Images by Standard Dithering

Figure 14A:
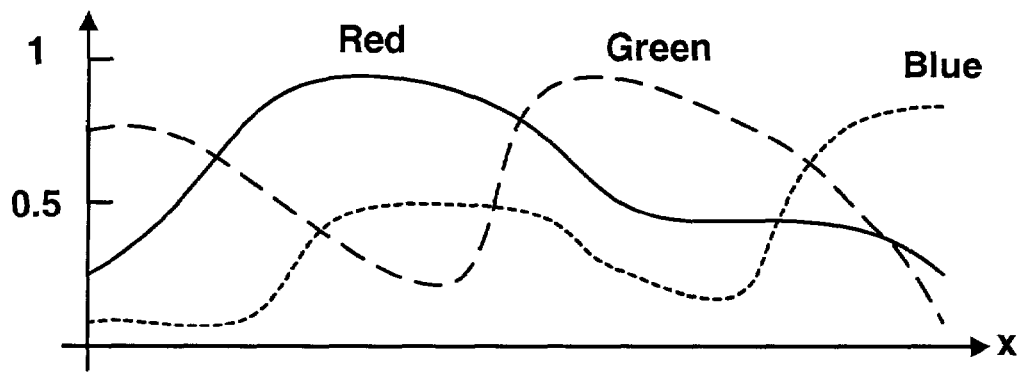
FIG. 14A shows a one-dimensional color RGB image with red, green and blue color intensities varying as function of their position on the x-axis.
Figure 14B:
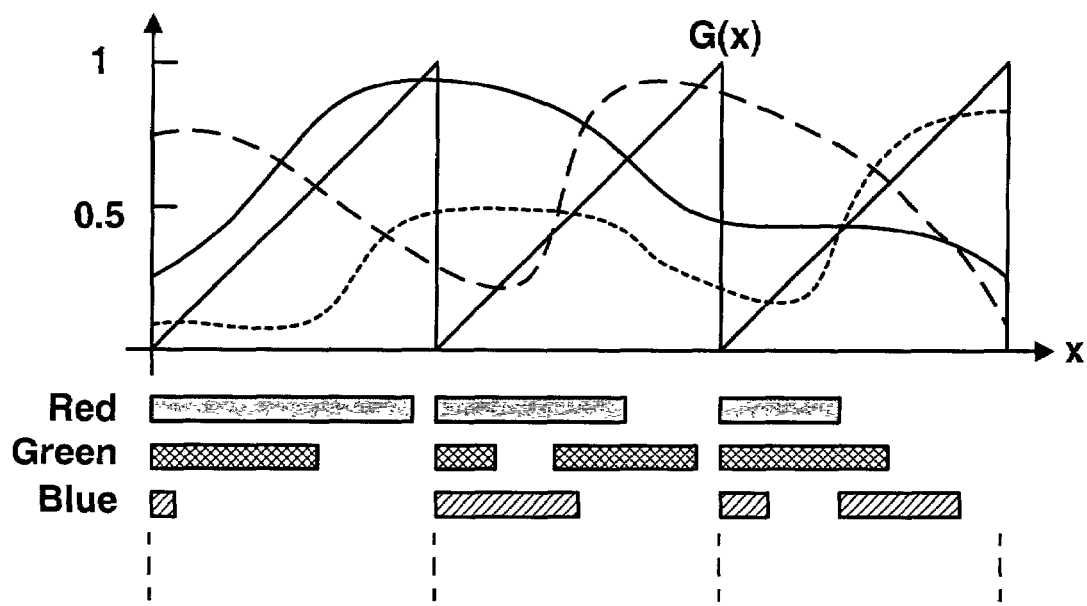
FIG. 14B shows schematically comparisons between the RGB input intensities of the image of FIG. 14A and a dither threshold value G(x) and according to these comparisons, the setting of the resulting basic colors (red, green and blue)
Figure 14C:
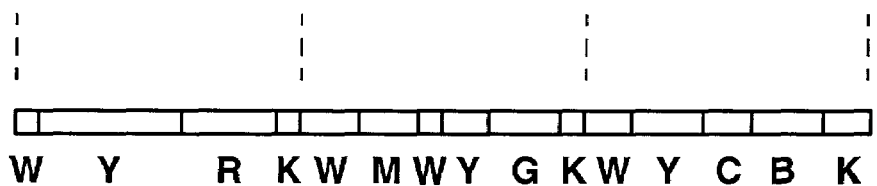
FIG. 14C shows the colors resulting from the superposition of the basic colors set according to the comparison of FIG. 14A.
Figure 15A:
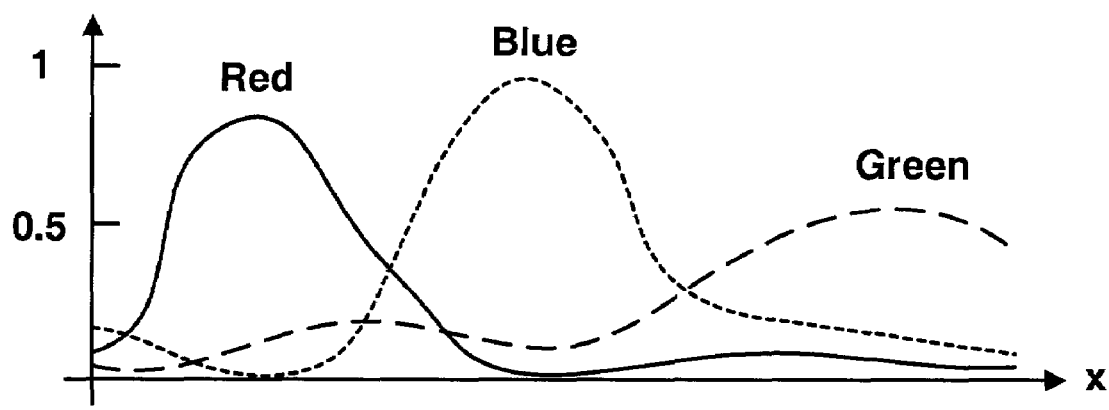
FIG. 15A shows a one-dimensional color RGB image with red, green and blue color intensities varying as function of their position on the x-axis.
Figure 15B:
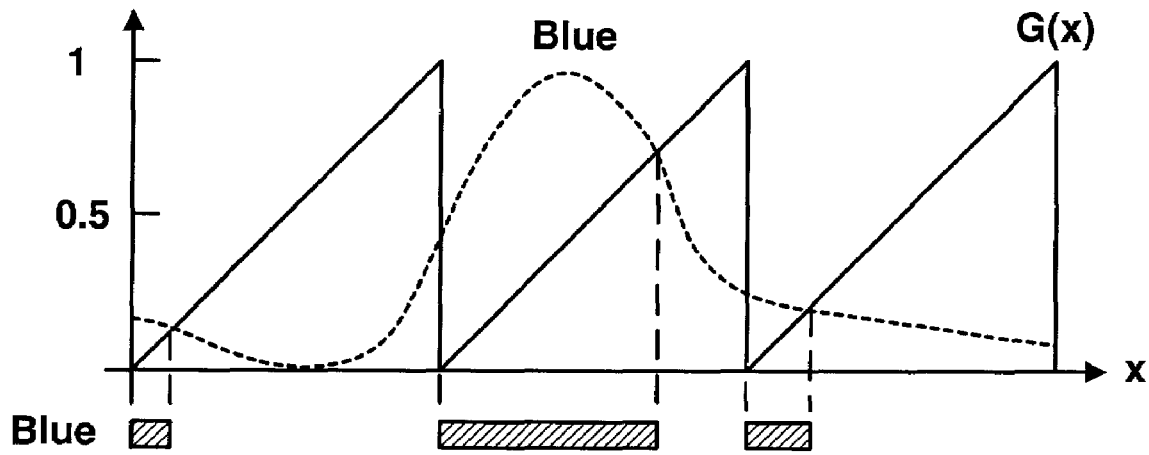
FIG. 15B shows schematically the comparison between the blue input intensity of the image of FIG. 15A and a dither threshold value G(x) and according to this comparison, the setting of the resulting basic blue color.
Figure 15C:
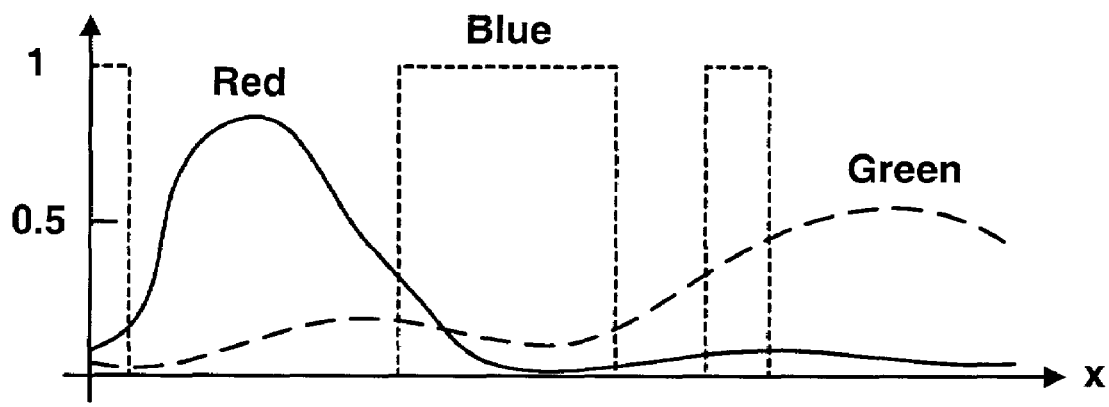
FIG. 15C shows the resulting target image comprising the original red and green colors and the dithered blue color.

It is however possible to generate images with animated microstructures by applying the standard dithering method independently to one or several basic colors. A basic color may be the set of red, green and blue or any other set of colors by which the image is described (for example cyan, magenta, yellow and black). One may apply standard dithering to one, several or all basic colors. As an example, one may apply standard dithering separately to the red, green and blue layers of an image (FIG. 14A and FIG. 14B) and display the resulting target image by superposing the dithered red, green and blue layers. The resulting target image will thus be rendered with red, green, blue, cyan (overlap of green and blue), magenta (overlap of red and blue), yellow (overlap of red and green) and white (overlap of red, green and blue), see FIG. 14C. Instead of applying standard dithering to red, green and blue as in the previous example, one may also apply standard dithering to one of the color layers, for example the predominant color layer or the color layer dominant in the image part where one would like to insert the microstructure. For example, in order to insert a microstructure in the sky, one may choose to apply standard dithering to the blue layer (FIG. 15B) and leave the other color layers unchanged, i.e. generate them by simple resampling of the original image (FIG. 15A) according to the target image size and resolution (FIG. 15C). In that case, target image pixels are composed of a blue color layer obtained with the standard dithering method and red and green layers obtained by resampling the original image.

Generation of Animated Microstructure Images by Multicolor Dithering

In the preferred embodiment of generating animated microstructure images by Multicolor Dithering, the method comprises initialization steps, rendering steps and an image display step.

The initialization steps comprise (a) the creation of a selection mask M(x,y) associated with the target image, deduced from the original mask M'(x',y') associated with the original image, (b) initialization for the color separation of the original image (e.g. RGB) according to the selected set of basic colors, (c) the creation of a data structure facilitating the color separation, (d) carrying out the color separation and associating in a color separation map to each target color image pixel the basic colors with which it is to be color dithered and their associated basic colors weights, (e) associating in a warping transform map to each location (x,y) within the target image space a pointer to the corresponding location in the animated dither matrix space according to the user defined warping transformation. Steps (c), (d) and (e) are useful for speeding up image rendition. As a variant, one may choose to carry out the color separation and possibly the warping transform during image rendering.

The target image selection mask M(x,y) is obtained by traversing the target image space (x,y) pixel by pixel, finding corresponding locations (x',y') in the original image space, and interpolating corresponding mask values from neighbouring original image pixel mask values M'(x',y'). Nearest neighbour interpolation associates one original image pixel mask value M' with each target image pixel mask value M. Bi-linear interpolation allows to interpolate between original image pixel mask values.

Several methods for carrying out the color separation exist: one may solve the Neugebauer equations for the set of output colors (see for example H.R. Kang, Color Technology for Electronic Imaging Devices, SPIE Optical Engineering Press, 1997, Chapter 2, Section 1, pp. 34-40) or place the output colors in an output color space, e.g. CIE-XYZ and tetrahedrize that space (see S. M. Chosson, R. D. Hersch, Visually-based color space tetrahedrizations for printing with custom inks, Proc. SPIE, 2001, Vol. 4300, 81-92). In that case, the preferred data structure facilitating the color separation is a 3D grid data structure pointing to the tetrahedra intersecting individual grid elements.

In the case that the selected basic colors are located in a rectilinear grid, the tetrahedrization is straightforward: each cube or rectilinear volume element comprising 8 vertices can be decomposed into 6 tetraheders (see H. R. Kang, Color Technology for Electronic Imaging Devices, SPIE Optical Engineering Press, 1997, Section 4.4 Tetrahedral interpolation, pp 70-72). If the designer is allowed to choose any set of basic colors, the tetrahedrization is slightly more complex, but can be carried out without difficulty with prior art methods (see for example the book Scientific Visualization: Overviews, Methodologies, and Techniques, by Gregory M. Nielson, Hans Hagen, Heinrich Muller, Mueller (eds), IEEE Press, Chapter 20, Tools for Triangulations and Tetrahedrizations and Constructing Functions Defined over Them, pp. 429-509).

In the case that the color separation is carried out by tetrahedrization, each target image pixel color is rendered by 4 basic colors, members of the selected set of the basic colors. For computing the 4 basic colors associated with each target image pixel (x,y), the color $C_r$ at the corresponding original image location (x',y') is determined by resampling, i.e. by interpolating between colors of neighbouring original image pixels (e.g. prior art nearest neighbour or bi-linear interpolation). Resampled color $C_r$ is used to find the tetrahedron which encloses it. The 4 basic colors $C_a$, $C_b$, $C_c$, $C_d$ located at the tetrahedron's vertices and their barycentric weights $d_a$, $d_b$, $d_c$, $d_d$ allowing to render resampled original image color $C_r$ according to $C_r = d_a C_a + d_b C_b + d_c C_c + d_d C_d$ should be stored, possibly together with original image resampled color $C_r$, in a target image color separation map.

The image rendering steps are as follows.

For rendering successive target image instances of the target animated microstructure image, for each target image instance, we traverse the target image space pixel by pixel by traversing one pixel row after the other. For each target pixel (x,y), if the target image mask value M(x,y) indicates that multi-color dithering is to be applied, (e.g. M(x,y)< >0), we read from the target image color separation map the basic colors and their respective weights. We determine the dither threshold value G associated with a target pixel (x,y) by obtaining the pointer to the corresponding location (u,v) in the animated dither matrix space, for example by accessing the warping transform map created in the initialization phase and from there, by applying the currently valid transformation $T_t(u,v)$, we obtain the current location (x",y") within the original dither matrix space. The threshold value G(x",y"), the basic colors $C_a$, $C_b$, $C_c$, $C_d$ and their respective weights $d_a$, $d_b$, $d_c$, $d_d$ are used for multicolor dithering. Multi-color dithering consists of determining the position of threshold value G with respect to intervals $0 \ldots d_a$, $d_a \ldots (d_a+d_b)$, $(d_a+d_b) \ldots (d_a+d_b+d_c)$, $(d_a+d_b+d_c) \ldots 1$. According to the interval within which G is located, the dithered target image color C(x,y) will take value $C_a$, $C_b$, $C_c$, or $C_d$ (see FIG. 7C and section "Multicolor dithering" above). In the case that standard dithering is used instead of multicolor dithering, we determine as above the dither threshold value G and use it to compare it with the intensity of the basic color (or colors) to be dithered and according to the comparison (see section "Standard dithering" above), use that basic color (or colors) to render the current target image pixel (x,y). FIG. 15B and FIG. 15C show how dithering can be applied to one of the image's color's, namely blue.

For each new target image instance to be rendered, the animation transformation $T_t(x,y)$ describing the mapping between the animated dither matrix space and the original dither matrix space is updated.

Figures 16A, 16B:
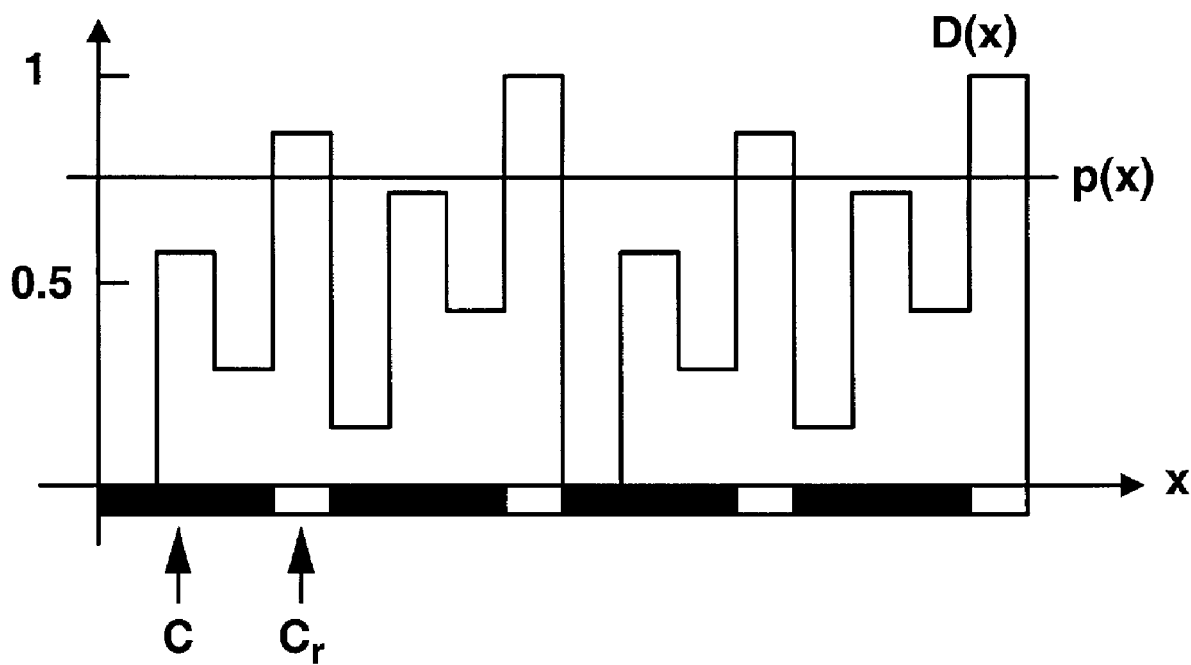
FIG. 16A shows a dispersed-dot two-dimensional dither matrix.
FIG. 16B shows the one-dimensional dithering of constant mask values p(x) with ID dither matrix values D(x) and the resulting spatial distribution of microstructure image color values C and original image resampled color values $C_r$.

In the case of a mask M(x,y) specifying discrete values representing a proportion p between 0 and 1, the final color $C_f(x,y)$ is a combination of the dithered color C(x,y) and of the original resampled color $C_r$, for example $C_f(x,y) = p\, C(x,y)+(1-p)C_r$. Instead of a pixel-wise blending between dithered image color C(x,y) and original resampled color $C_r$, it is also possible to apply a spatial blending, i.e. to ensure that only proportion p of neighbouring pixels take the dithered color C(x,y) and proportion (1-p) takes the original resampled color values $C_r$. For this purpose, one can use for example a spatial dispersed dither matrix D(x,y), e.g. Bayer's 4×4 dither matrix (FIG. 16A) and use thresholds t=0, 1, 2 . . . 15 to decide if a pixel should take the original resampled color value $C_r$, when p=<t/16 or take the dithered color C when p>t/16. As an illustration of spatial blending, FIG. 16B shows in one-dimensional space the comparison between the proportion p(x) and the dither values D(x): where p(x)>D(x), the corresponding segment (black in FIG. 16B) takes the dithered image color values C(x)

and where p(x)<=D(x), the corresponding segment (white in FIG. 16B) takes the original resampled color values $C_r(x)$.

The display step comprises the display of successively generated animated microstructure image instances.

A Schematic Example

Figure 9A:
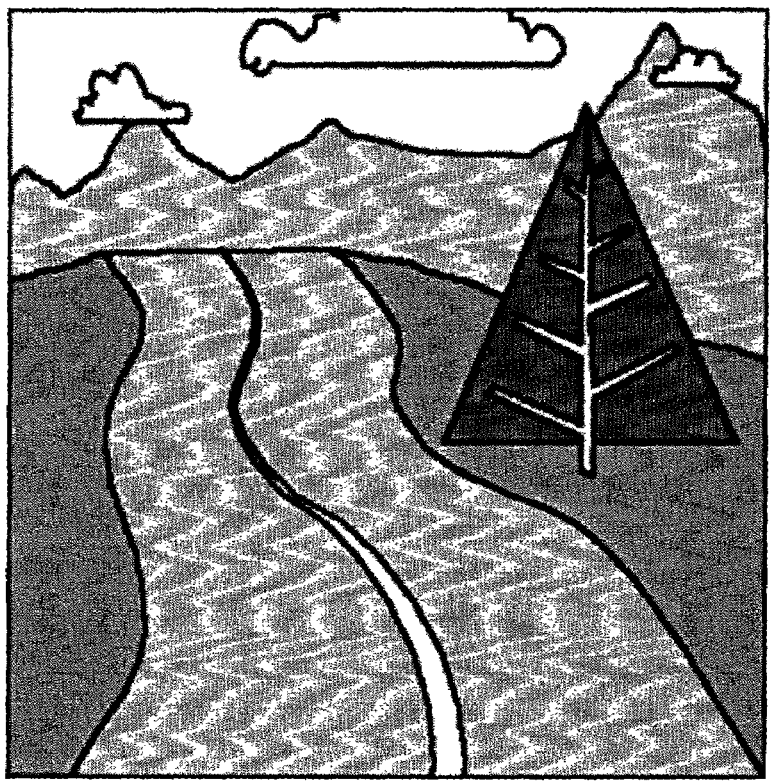
FIG. 9A shows schematically an original image.
Figure 9A:
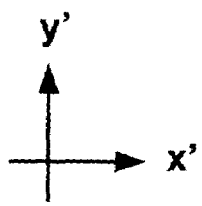
Figure 9B:
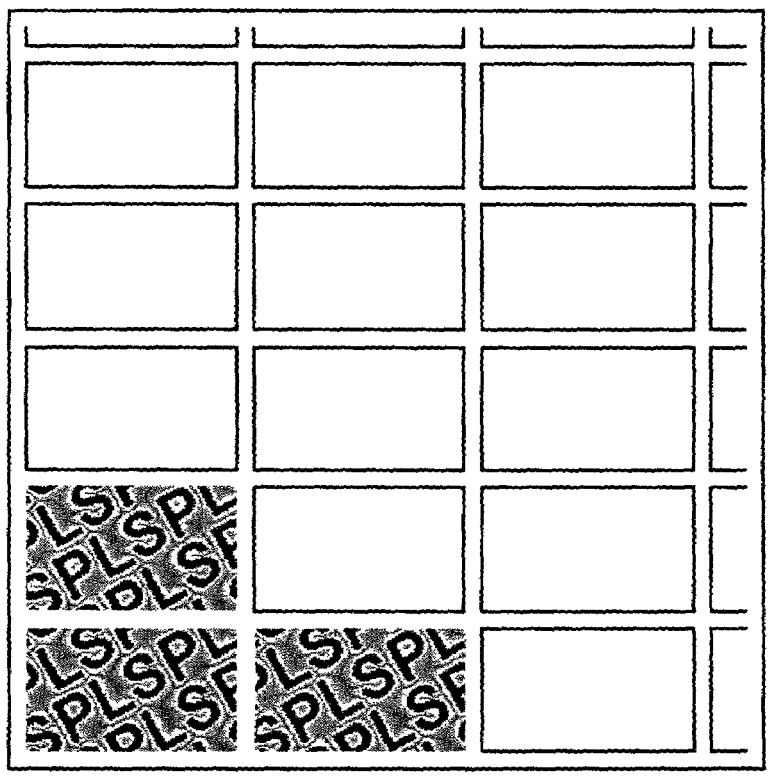
FIG. 9B shows schematically a dither matrix paving an original dither matrix space.
Figure 9B:
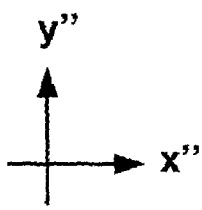
Figure 10A:
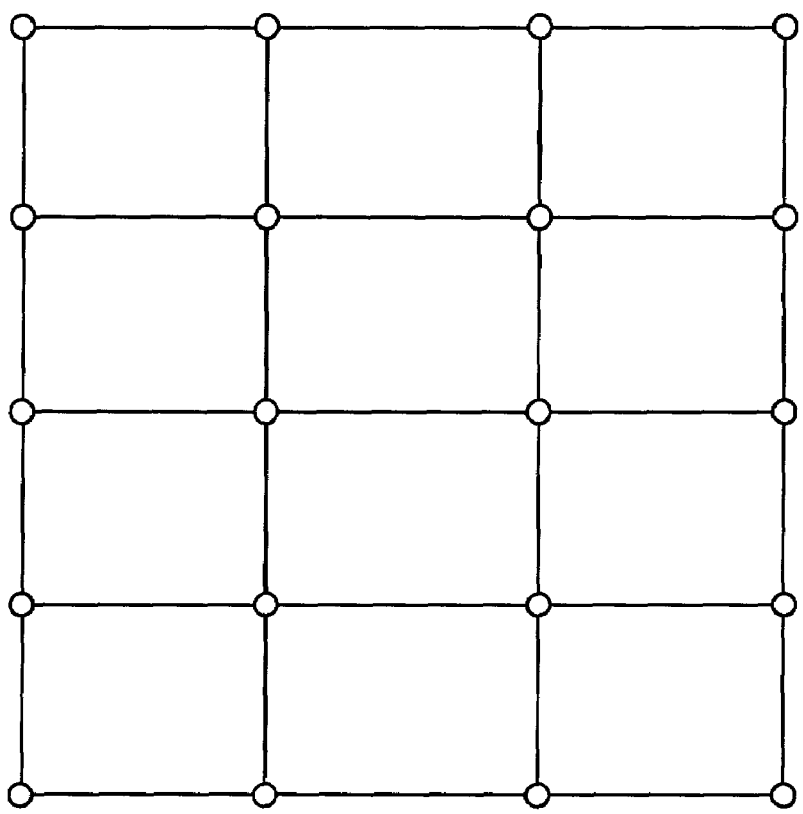
FIG. 10A shows a warping grid laid out in an animated dither matrix space.
Figure 10B:
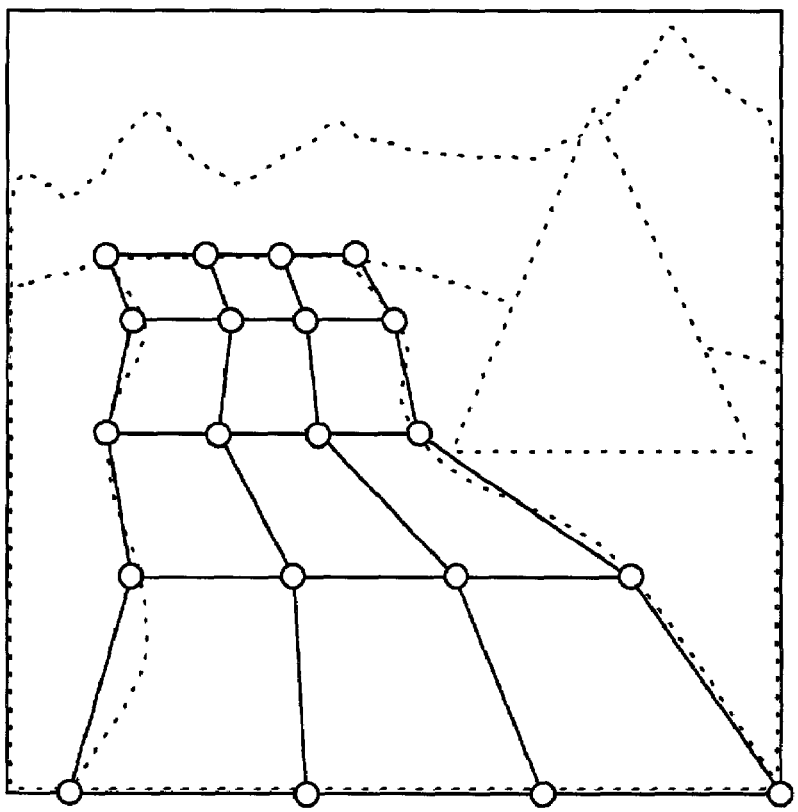
FIG. 10B shows the grid of FIG. 10A, warped and laid out on top of the target image.
Figure 11A:
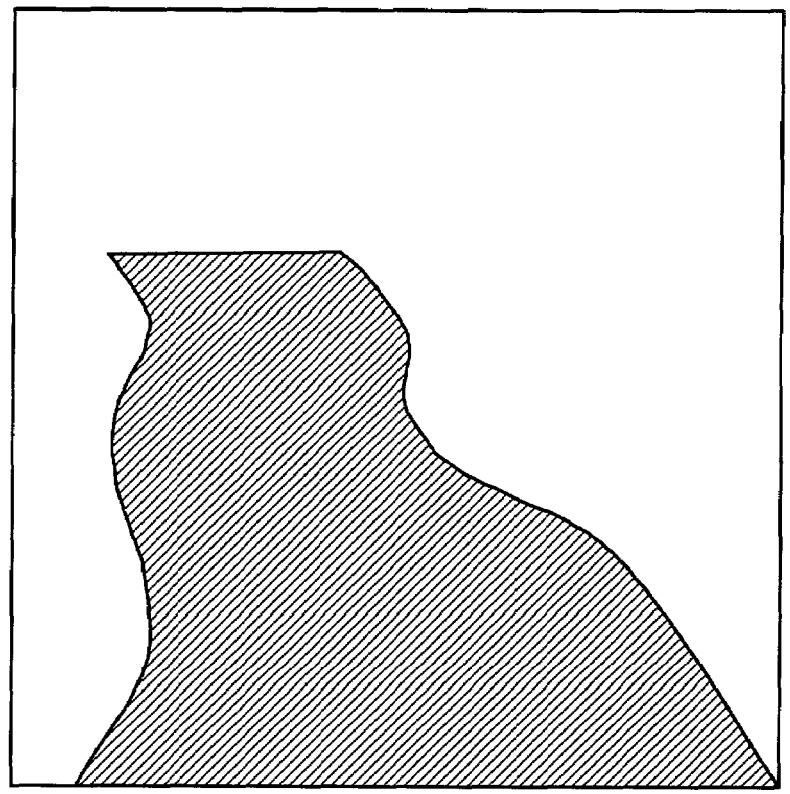
FIG. 11A shows a mask specifying the part of the target image to be rendered.
Figure 11B:
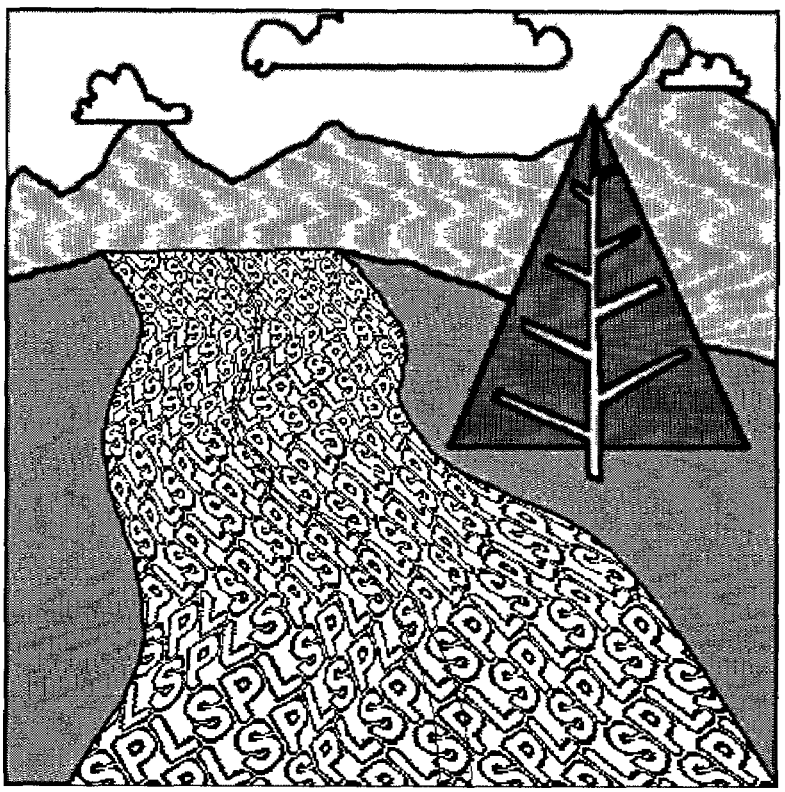
FIG. 11B shows one instance of the target image rendered with an animated microstructure.
Figures 13B, 13C:
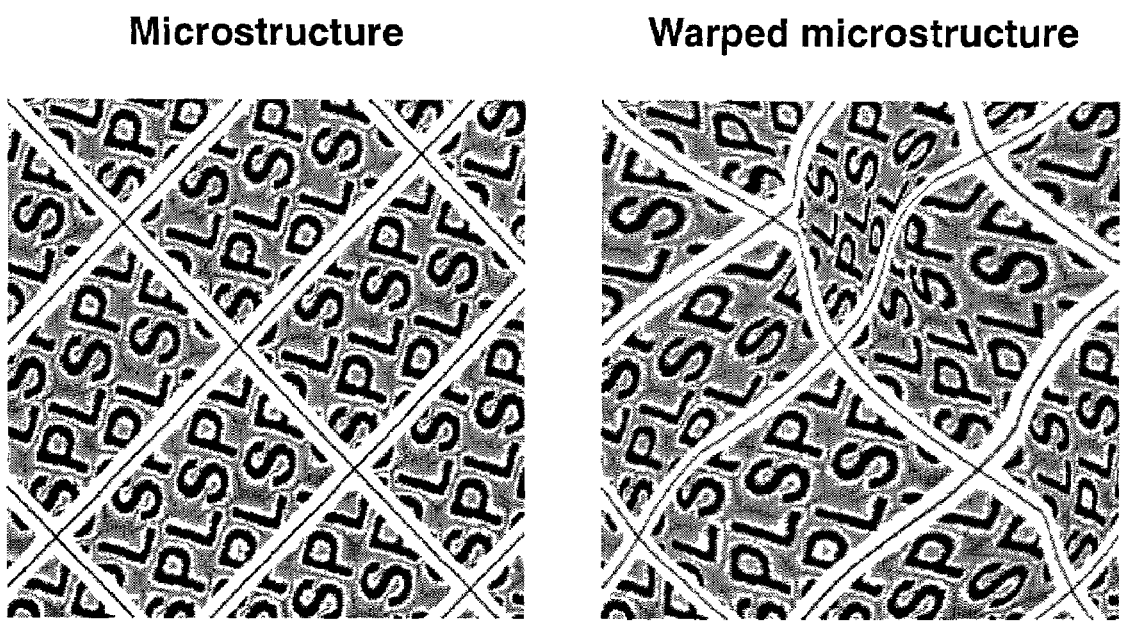
FIG. 13B shows a microstructure in an animated microstructure space.
FIG. 13C shows the same microstructure in the target image space, warped by the warping transformation defined according to FIG. 13A.

As an example let us assume FIG. 9A represents the original color image. FIG. 9B represents the dither matrix paving the original dither matrix space. The time or frame-dependent animation transformation $T_t$ maps the animated dither matrix within an animated dither matrix space into the original dither matrix space. FIG. 10A represents a warping grid laid out over the animated dither matrix space. In FIG. 10B, the warped grid is shown in the target image space. The warping transformation $T_w$ allows to map locations from the target image space into corresponding locations in the animated dither matrix space. FIG. 11A shows a mask specifying which part of the original image needs to be rendered by animated microstructures. FIG. 11B shows schematically the rendered target color image space, where the part covered by the mask is rendered with animated microstructures. If the animation transformation is a simple vertical translation as a function of time, the microstructure will move vertically in successive displayed frames. The "LSP" microstructure is obtained thanks to the warping transformation (FIG. 13A) which transforms for example the repetitive microstructure shown in FIG. 13B into the warped microstructure shown in FIG. 13C.

A Real Example

Figure 3:
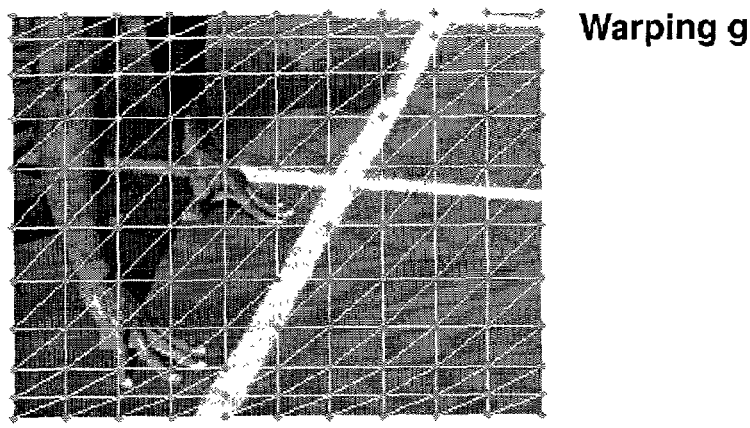
FIG. 3 shows an image overlaid with a warping grid.
Figure 4:
FIG. 4 shows a mask specifying the parts of the image to be rendered with animated microstructures (in black)
Figure 6:
FIG. 6 shows a sequence of 6 other instances of the animated microstructure image.
Figure 6:
Figure 6:
Figure 6:
Figure 6:
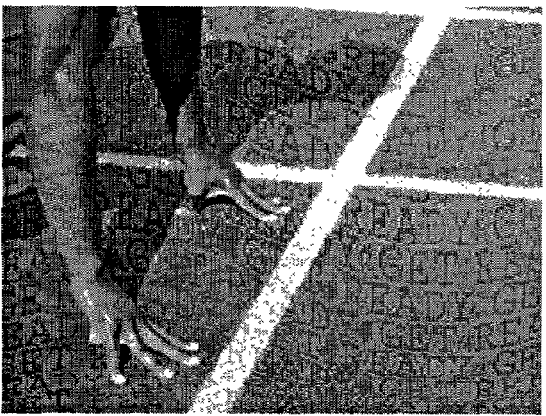
Figure 6:

As real example, FIG. 1. shows a dither matrix comprising the "GET READY" microstructure shapes. FIG. 2. shows the microstructure obtained by dithering with constant foreground color intensity levels of 20%, 40%, 60% and 80% (the foreground color is shown in black, the background is represented by the paper white). FIG. 3. shows the original image, with a superimposed warping grid (the grid is made of rectangular elements, with one additional diagonal per rectangle defining two triangles; the triangles are used for the warping transformation). In the present case, the warping grid has the effect of shrinking the microstructure at the bottom and top of the image. FIG. 4 shows the bi-level mask specifying the regions to be rendered with a animated microstructure and FIG. 5 shows one instance of the resulting image comprising an animated microstructure in the regions specified by the mask. One can easily perceive the microstructure made of the warped "GET READY" shapes. FIG. 6 shows several instances of the rendered animated microstructure image, i.e. the rendered animated microstructure image at different time points. The animation transformation moves the microstructure up and down and at the same time displaces it slowly to the left. The animation transform $T_t$ of this example has the form $$x'' = s_x(u + k_u \cdot i)$$

$$y'' = s_y\left(v + A \cdot \cos\left((s \cdot i + u)\frac{360}{\lambda}\right)\right)$$

where i is the number of the current target image instance, s is the wave oscillating speed, $k_u$ is the horizontal translation speed, $\lambda$ is the horizontal period of the microstructure wave, A is its amplitude and $s_x$, $s_y$ represent respectively horizontal and vertical scaling factors. The cosinusoidal vertical displacement of the microstructure depends on its current location u, i.e. there is a phase difference in the vertical displacement of the microstructure at different horizontal locations.

Generalization to Image Animations (Moving Images, Videos)

The method described above can be easily generalized to moving images, image animations and videos made of individual frames. Each frame will incorporate a visible microstructure. Frames with animated microstructure are created by rendering successive frames as separate images with an animated microstructure. Instead of a single original image, successive frames are used as original images and rendered using the animated microstructure defined by the dither matrix, the animation transformation, the warping transformation, the set of basic colors $\{C_i\}$ and a possible mask layer comprising one or several masks, possibly up to one mask per frame. The mask values evolving over time yield apparent changes in embedded microstructure appearance properties such as visibility, position or spatial extension. These mask values may be adapted according to moving visual elements of the image animation. For example when the moving camera recording the image animation follows a river, the evolving mask shape may take the evolving shape of the river, allowing to confine the evolving microstructure within the moving river present in the image animation.

Computing System for Displaying Images with Animated Microstructure

Figure 17:
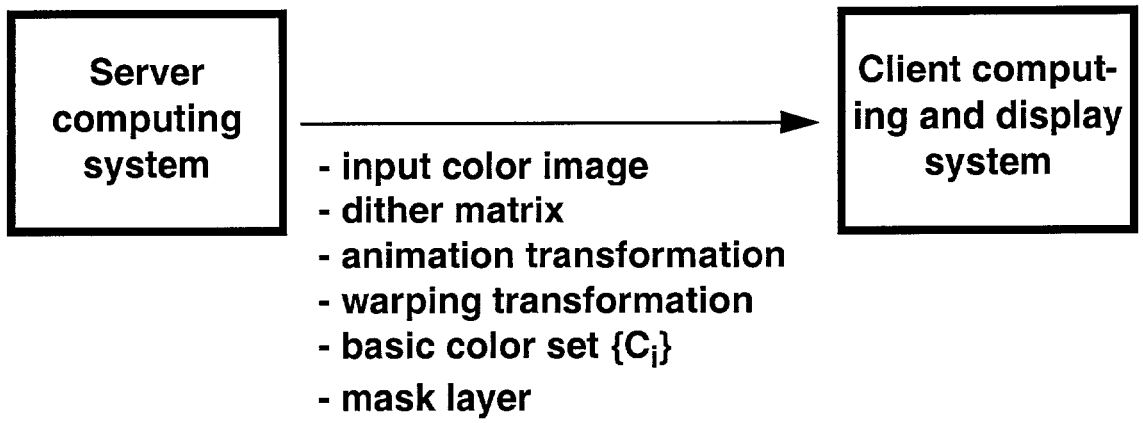
FIG. 17 shows a server computing system transferring to a client computing and display system an input color image, a dither matrix, an animation transformation, a warping transformation, a set of basic colors and a mask layer.

Images with animated microstructures can be synthesized offline by a computer running an animated microstructure image rendering software. The resulting image animation can then be incorporated into Web pages as animated images (e.g. animated GIF or MNG formats). An alternative consists in creating an image computing and display system, for example an applet, running the animated microstructure image rendering software. In that case, the image computing and display system will run on the client's computer and display the animated microstructure image or image animation. As a preferred embodiment, the image computing and display system will receive from the server computing system (FIG. 17) as input data the input color image, the dither matrix, the animation transformation, the warping transformation, the set of basic colors $\{C_i\}$ and a possible mask layer. With the present technology, the preferred embodiment of an image computing and display system is a Java applet. The image computing and display system's program (e.g. the program running as an applet) will then generate and display the target image by carrying out the initialization, image rendering and image display steps described above.

In addition, specific embodiments of the animated microstructure image rendering system may allow to tune some of the image rendering parameters according to user preferences or user profiles. For example one image selected from a set of images, one set of basic colors selected from various sets of basic colors, one dither matrix selected from different dither matrices, one animation transformation and possibly a warping transformation may be tuned according to user preferences or profiles. These specific embodiments allow to customize the animated microstructure images according to users or user categories.

Server System for Designing Images with Animated Microstructure

Figure 18:
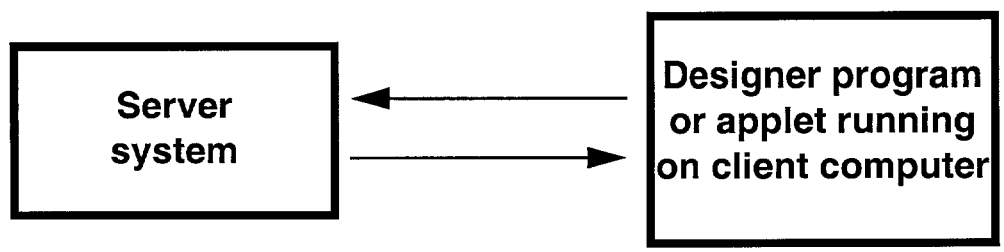
FIG. 18 shows a server system interacting with a designer program or a designer applet running on a client computer.
Figure 19:
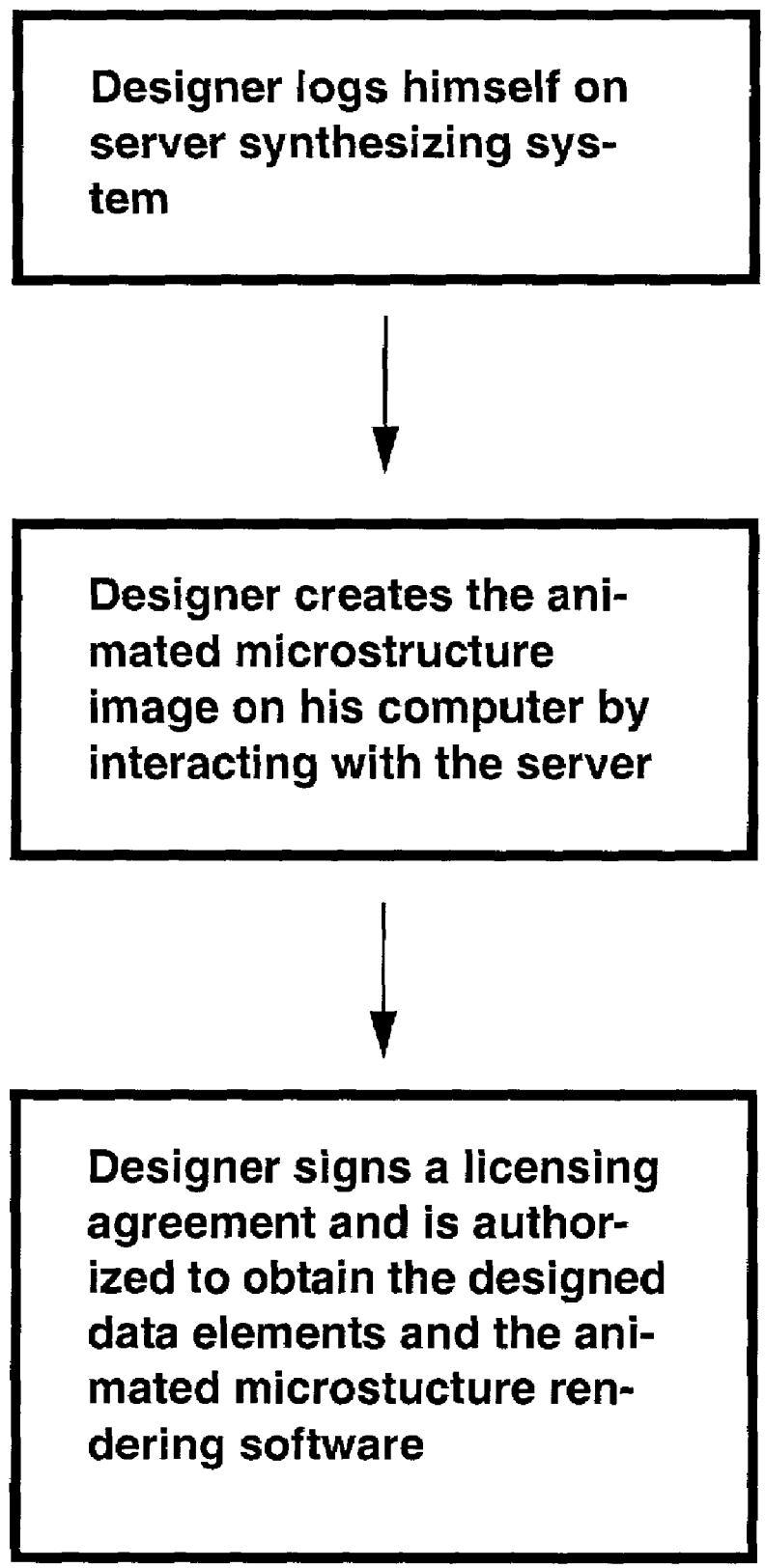
FIG. 19 shows a flow chart describing the steps required to create and obtain the designed data elements and the animated microstructure rendering software.
Figure 20:
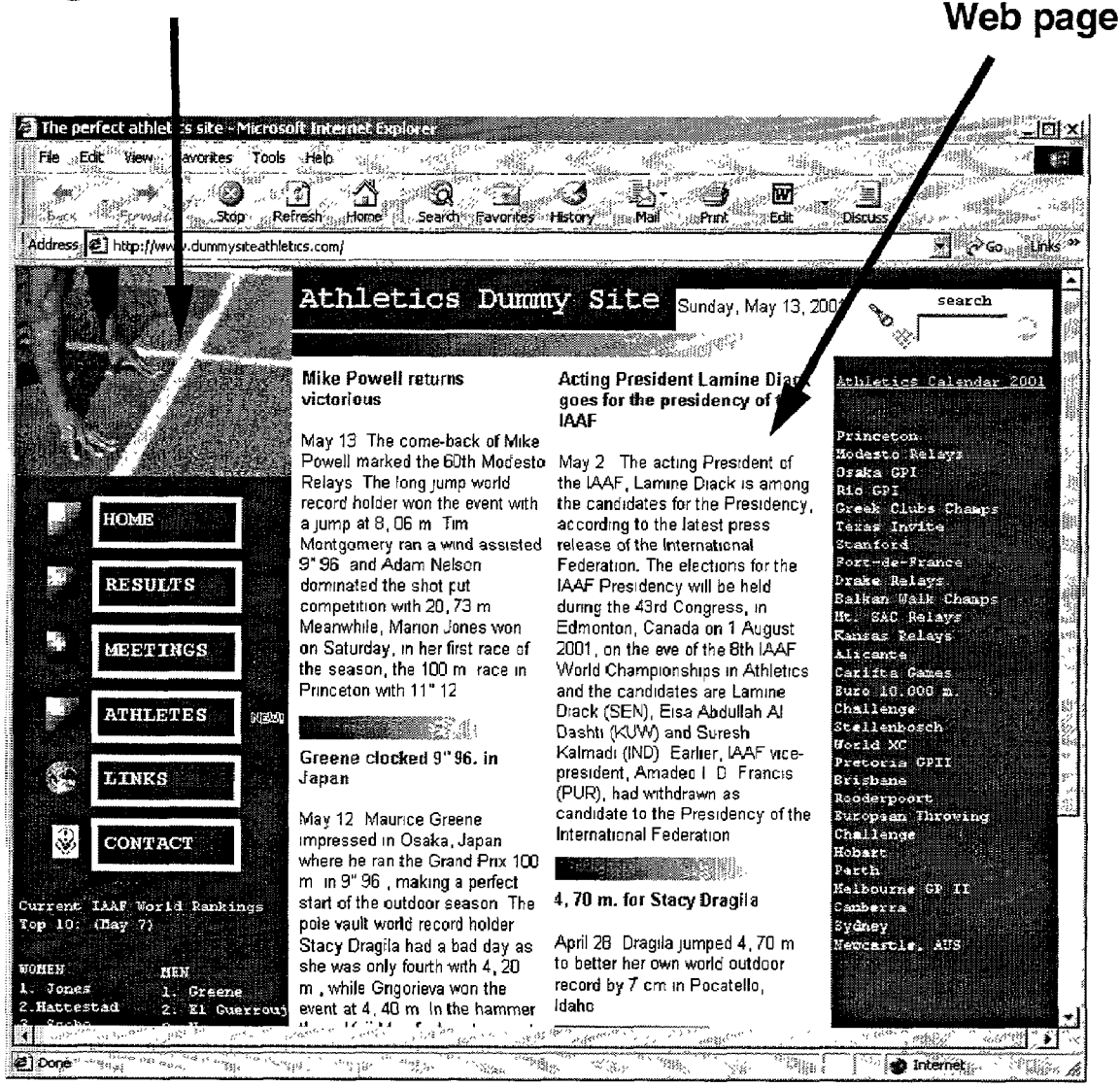
FIG. 20 shows a Web page incorporating an animated microstructure image.

Optionally, a specific server (e.g. a Web site) can be conceived which allows designers to create images with animated microstructures on their own computers (FIG. 18). The program interface running on their computers (e.g. dynamic Web page incorporating an applet) will exchange information with the server. With such a Web based design interface, designers or graphists may specify or create the source image, the dither matrix, the basic colors, the animation transform, the warping transform and the image mask layer. By being able to modify interactively each of these parameters and elements, and immediately visualizing the results, designers may be able to interactively create appealing images with animated microstructures. Upon signing a licensing agreement, they may then receive the authorization to transfer the animated microstructure rendering software (e.g. the applet's code) as well as the created data elements into their own Web pages (FIG. 19). FIG. 20 shows an image with animated microstructure incorporated into a Web page.

Software for Offline Design of Animated Microstructure Images

Alternately, clients interested in creating animated microstructure images may sign a licensing agreement and receive the software allowing them to locally conceive the elements necessary for creating images with animated microstructures as described above. These elements may then be sent to the Web server which upon signing a licensing agreement, may then issue an applet able to run the so-created animated microstructure image.

REFERENCES CITED

Patent Applications and Patents
1. U.S. Pat. No. 6,198,545, Method and apparatus for generating halftone images by evolutionary screen dot contours, inventors: V. Ostromoukhov, R. D. Hersch, filed Mar. 27, 1995, issued Mar. 6, 2001
2. U.S. patent application Ser. No. 09/477,544, Method an apparatus for generating digital halftone images by multicolor dithering, inventors: V. Ostromoukhov, R. D. Hersch, filed Jan. 4, 2000
3. European Patent application 99 114 740.6, published as EP1073257A1, Method for generating a security document, inventors R. D. Hersch, N. Rudaz, filed Jul. 28, 1999.
4. U.S. Pat. No. 5,530,759, Color Correct Digital Watermarking of Images, inventors W. Braudaway, K. A. Magerlein and F. C. Mintzer, Filed February 1995, issued Jun. 25, 1996.

Publications
H. R. Kang, Digital Color Halftoning, SPIE Press and IEEE Press, Chapter 13, Clustered-dot ordered dither, 213-231
H. R. Kang, Color Technology for Electronic Imaging Devices, SPIE Optical Engineering Press, 1997, Chapter 2, Color-mixing models, Section 1, pp. 34-40
H. R. Kang, Color Technology for Electronic Imaging Devices, SPIE Optical Engineering Press, 1997, Section 4.4 Tetrahedral interpolation, pp 70-72
1. V. Ostromoukhov, R. D. Hersch, "Artistic Screening", Siggraph 95, Proc. Computer Graphics, Annual Conference Series pp. 219-228.
V. Ostromoukhov, R. D. Hersch, "Multi-Color and Artistic Dithering", Siggraph'99, Computer Graphics Proceedings, Annual Conference Series, 1999, pp. 425-432.
M. Shapira, A. Rappoport, "Shape blending using the star-skeleton representation", IEEE Computer Graphics and Applications, Volume 15, No. 2, March 1995, pp. 44-50
Oleg Veryovka and John Buchanan, Halftoning with Image-Based Dither Screens, Graphics Interface Proceedings, 1988-99, Ed. Scott MacKenzie and James Stewart, Morgan Kaufmann Publ. or http://www.graphicsinterface.org/proceedings/1999/106/.
Gregory M. Nielson, Hans Hagen, Heinrich Muller, Mueller (eds), Scientific Visualization Overviews, Methodologies, and Techniques, IEEE Press, Chapter 20, Tools for Triangulations and Tetrahedrizations and Constructing Functions Defined over Them, pp. 429-509

We claim:

1. A method for electronically displaying a target image with an animated microstructure, said method being performed by a computing system where the target image rendered by said computing system is made of a succession of target image instances which differ from each other by an embedded microstructure evolving over time, the method comprising the steps of
    (a) defining within a memory of said computing system a two-dimensional original image;
    (b) defining within a memory of said computing system a time-dependent geometric animation transformation between an original microstructure space and a transformed microstructure space, said transformation specifying how said embedded microstructure spatially evolves in successively displayed target image instances; and
    (c) rendering on a display of said computing system from said two-dimensional original image said succession of target image instances comprising said embedded microstructure evolving over time,
    where said rendering step comprises computer performed steps of
    (i) mapping positions between target image instances and positions within said original microstructure space according to said time-dependent geometric animation transformation and of
    (ii) halftoning said two-dimensional original image;
    where said embedded microstructure is made of visual motive elements selected from a set of text, logo, symbol and ornament;
    where said halftoning step converts intensities into surface coverages of a limited set of basic colors, thereby adapting colors of said visual motive elements to colors of said two-dimensional original image;
    where said visual motive elements evolve spatially independently of a content of said two-dimensional original image;
    where, due to said time-dependent geometric animation transformation, said visual motive elements evolve smoothly and continuously;
    where the target image instances represent simultaneously at a global image level the spatially continuous original two-dimensional image and at a microstructure level said visual motive elements; and
    where said target image instances shown on said computer display provide to a human observer visually attractive and useful information.

2. The method of claim 1, where only a part of said two-dimensional original image defined by a mask is rendered with said embedded microstructure.

3. The method of claim 1, where an additional step performed on said computing system specifies said limited set of basic colors for rendering said target image instances.

4. The method of claim 3, where said halftoning step is carried out by dithering at least one of the basic colors with a dither matrix embedding the microstructure.

5. The method of claim 3, where said halftoning step is carried out by multicolor dithering with said limited set of basic colors and with a dither matrix embedding the microstructure made of said visual motive elements.

6. The method of claim 1, where the evolution of said embedded microstructure over time comprises a blending between two of the motive elements.

7. The method of claim 1, where the embedded microstructure is made more flexible by an additional warping transformation mapping performed by said computing system between a target image space containing the target image and an animated dither matrix space defined by said time-dependent geometric animation transformation.

8. A computing system rendering on a computer display a target image comprising a succession of target image instances which differ from each other by an embedded microstructure evolving smoothly over time, said computing system rendering from an original two-dimensional image stored in a memory of said computing system the succession of target image instances comprising said embedded microstructure, where said computing system comprises a computing module for mapping positions between target image instances and positions within an original microstructure space according to a time-dependent geometric animation transformation and comprises a computing module for halftoning said two-dimensional original image;

where said embedded microstructure is made of visual motive elements selected from a set of text, logo, symbol and ornament;

where said halftoning computing module converts the original two-dimensional image intensities into surface coverages of a limited set of basic colors, thereby adapting colors of said visual motive elements to colors of said two-dimensional original image;

where said visual motive elements produced by said halftoning computing module evolve spatially independently of a content of said two-dimensional original image;

where, due to said time-dependent geometric animation transformation, said visual motive elements evolve smoothly and continuously;

where the target image instances represent simultaneously at a global image level the spatially continuous original two-dimensional image and at a microstructure level said visual motive elements and where said target image instances shown on said computer display provide to a human observer visually attractive and useful information.

9. The computing system rendering the target image of claim 8, where the visibility of the embedded microstructure is tuned by a mask whose values represent relative weights of said original two-dimensional image without embedded microstructure and a corresponding image rendered with the embedded microstructure.

10. The computing system rendering the target image of claim 9, where the mask values evolving over time yield apparent changes in at least one of the embedded microstructure appearance properties selected from a set of visibility, position and spatial extension properties.

11. The computing system rendering the target image of claim 9, where contributions of said two-dimensional original image and said image rendered with the embedded microstructure are spatially distributed.

12. The computing system rendering the target image of claim 8, where the halftoning computing module performs a dithering operation taking as input said two-dimensional original image and produces with said limited set of basic colors a dithered image, said dithering operation being selected from standard dithering and multicolor dithering.

13. A computing system for electronically rendering on a display a spatially continuous target image with an embedded microstructure evolving over time, said computing system comprising a server computing system located at one Internet location for rendering said target image from an original image by synthesizing target image instances and comprising a client computing system located at another Internet location receiving instances of said target image from the server computing system and displaying the target image instances on said display, where a time-dependent geometric animation transformation specifies how said embedded microstructure spatially smoothly evolves over a succession of displayed target image instances, where said embedded microstructure is made of visual motive elements selected from a set of text, logo, symbol and ornament, where said visual motive elements evolve spatially independently of a content of said original image;

where said server computing system comprises a computing module for mapping positions between target image instances and positions within an original microstructure space according to said time-dependent geometric animation transformation and comprises a computing module for halftoning said two-dimensional original image;

where said halftoning computing module synthesizes the target image instances from said original image by converting original image intensities into surface coverages of a limited set of basic colors thereby adapting colors of said visual motive elements to colors of said original image;

where, due to said time-dependent geometric animation transformation, said visual motive elements evolve smoothly and continuously; and where said target image instances shown on said display provide to a human observer visually attractive and useful information.

14. The computing system of claim 13, where the server computing system is a Web server and where the target image instances are displayed by the client computing system within a Web page.

15. A computing system displaying a spatially continuos target image with an embedded microstructure spatially evolving over time, said computing system comprising a server computing system located at one Internet location and a client computing and display system located at another Internet location, where the client computing and display system receives from the server computing system as input data an original color image, microstructure data and microstructure evolution parameters and where the client computing and display system renders said target image from said original color image by synthesizing target image instances with said embedded microstructure on the fly, where said embedded microstructure is made of visual motive elements selected from a sot of text, logo, symbol and ornament, where the microstructure evolution parameters comprise a time-dependent geometric animation transformation specifying how said embedded microstructure spatially evolves over a succession of displayed target image instances, where said visual motive elements evolve spatially independently of a content of said original color image, where rendering by said client computing and display system the target image instances from said original image comprises executing a halftoning operation which converts intensities into surface coverages of a limited set of basic colors, thereby adapting colors of said visual motive elements to colors of said original color image;

where, due to said time-dependent geometric animation transformation, said visual motive elements evolve smoothly and continuously; and where said target image instances shown by said client computing and display system provide to a human observer visually attractive and useful information.

16. The computing system of claim 15, where the microstructure data received by the client computing and display system comprises a dither matrix, and where the client computing and display system executing said halftoning operation synthesizes as target image instances dithered images by performing an operation selected from the set of standard dithering and multicolor dithering.

17. The computing system of claim 15, where the microstructure evolution parameters also comprise a warping transformation and where the client computing and display system also receives from the server computing system as input data a mask whose values represent relative weights of the original color image and of image instances obtained by executing said halftoning operation, the mask defining the position and visibility of the microstructure within the target image.

* * * * *